United States Patent
Seok et al.

(10) Patent No.: US 11,693,188 B2
(45) Date of Patent: Jul. 4, 2023

(54) WAFER-SCALE-INTEGRATED SILICON-PHOTONICS-BASED OPTICAL SWITCHING SYSTEM AND METHOD OF FORMING

(71) Applicant: The Regents of the University of California, Oakland, CA (US)

(72) Inventors: Tae Joon Seok, Berkeley, CA (US); Ming Chiang A Wu, Moraga, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 17/839,173

(22) Filed: Jun. 13, 2022

(65) Prior Publication Data

US 2022/0317381 A1    Oct. 6, 2022

Related U.S. Application Data

(63) Continuation of application No. 16/768,233, filed as application No. PCT/US2018/063127 on Nov. 29, 2018, now Pat. No. 11,360,272.

(Continued)

(51) Int. Cl.
| | |
|---|---|
| *G02B 6/35* | (2006.01) |
| *G02B 6/12* | (2006.01) |
| *G02B 6/293* | (2006.01) |

(52) U.S. Cl.
CPC ......... *G02B 6/3546* (2013.01); *G02B 6/3508* (2013.01); *G02B 6/12007* (2013.01); *G02B 6/29344* (2013.01); *G02B 2006/12145* (2013.01)

(58) Field of Classification Search
None
See application file for complete search history.

(56) References Cited

U.S. PATENT DOCUMENTS

| | | | |
|---|---|---|---|
| 6,028,973 A | 2/2000 | Schienle et al. | |
| 6,160,927 A * | 12/2000 | Leclerc | G02B 6/26 |
| | | | 385/129 |

(Continued)

FOREIGN PATENT DOCUMENTS

| | | |
|---|---|---|
| JP | 56-048603 A | 5/1981 |
| JP | 09-005799 A | 1/1997 |

(Continued)

OTHER PUBLICATIONS

Akhilesh S. P. Khope et al., "Elastic WDM crossbar switch for data centers," Proc. of the 2016 IEEE Optical Interconnects Conference (OI), dated 2016, pp. 48-49.

(Continued)

*Primary Examiner* — Jerry Rahll
(74) *Attorney, Agent, or Firm* — Kaplan Breyer Schwarz, LLP

(57) ABSTRACT

A large-scale single-photonics-based optical switching system that occupies an area larger than the maximum area of a standard step-and-repeat lithography reticle is disclosed. The system includes a plurality of identical switch blocks, each of is formed in a different reticle field that no larger than the maximum reticle size. Bus waveguides of laterally adjacent switch blocks are stitched together at lateral interfaces that include a second arrangement of waveguide ports that is common to all lateral interfaces. Bus waveguides of vertically adjacent switch blocks are stitched together at vertical interfaces that include a first arrangement of waveguide ports that is common to all vertical interfaces. In some embodiments, the lateral and vertical interfaces include waveguide ports having waveguide coupling regions that are configured to mitigate optical loss due to stitching error.

25 Claims, 13 Drawing Sheets

Related U.S. Application Data

(60) Provisional application No. 62/592,815, filed on Nov. 30, 2017.

(56) References Cited

U.S. PATENT DOCUMENTS

| | | | |
|---|---|---|---|
| 6,970,619 B2 | 11/2005 | Baumann et al. | |
| 7,116,856 B2 | 10/2006 | Iio et al. | |
| 8,891,914 B2 * | 11/2014 | Ticknor | G02B 6/35 385/20 |
| 8,938,142 B2 * | 1/2015 | Shastri | G02B 6/42 385/88 |
| 9,405,066 B2 | 8/2016 | Mahgerefteh et al. | |
| 10,715,887 B2 | 7/2020 | Seok et al. | |
| 2002/0034372 A1 * | 3/2002 | Alibert | G02B 26/004 385/147 |
| 2002/0181855 A1 | 12/2002 | Xue et al. | |
| 2003/0010827 A1 | 1/2003 | Hilton et al. | |
| 2003/0108274 A1 | 6/2003 | Haronian | |
| 2003/0108290 A1 | 6/2003 | Zhang et al. | |
| 2007/0258681 A1 | 11/2007 | Takabayashi et al. | |
| 2009/0220228 A1 | 9/2009 | Popovic | |
| 2012/0105944 A1 | 5/2012 | Wang et al. | |
| 2012/0170111 A1 | 7/2012 | Doerr et al. | |
| 2014/0212104 A1 | 7/2014 | Cho et al. | |
| 2016/0327751 A1 * | 11/2016 | Wu | G02B 6/355 |
| 2016/0359568 A1 | 12/2016 | De Dobbelaere et al. | |
| 2019/0253775 A1 | 8/2019 | Seok et al. | |

FOREIGN PATENT DOCUMENTS

| | | |
|---|---|---|
| WO | 2014/089454 A2 | 6/2014 |
| WO | 2015/147966 A2 | 10/2015 |
| WO | 2018/049345 A2 | 3/2018 |

OTHER PUBLICATIONS

Dritan Celo et al., "32×32 Silicon Photonic Switch," presented at the Optoelectronics and Communications Conference (OECC), dated 2016, 3 pp.

Final Rejection dated Nov. 24, 2021 for U.S. Appl. No. 16/768,233.

Han Wan et al., "2×2 Adiabatic 3-dB Coupler on Silicon-on-Insulator Rib Waveguides", Publisher: Department of electrical and Computer Engineering, University of British Columbia, Vancouver, Canada, Published in: CA.

Ken Tanizawa et al., "Novel polarization diversity without switch duplication of a Si-wire PILOSS optical switch", Optics Express, Mar. 21, 2016, Publisher: Optical Society of America, 8 pp., vol. 24, No. 7 l.

Kyungmok Kwon et al., "128×128 Silicon Photonic MEMS Switch with Scalable Row/Column Addressing," in Conference on Lasers and Electro-Optics, paper SF1A.4, dated 2018, p. SF1A.4.

Non-Final Rejection dated May 12, 2021 for U.S. Appl. No. 16/768,233.

Notice of Allowance and Fees Due (PTOL-85) dated Feb. 22, 2022 for U.S. Appl. No. 16/768,233.

Amin Vahdat et al., "The emerging optical data center," in Optical Fiber Communication Conference, Publisher: Optical Society of America, dated 2011, 3 pp.

Authorized Officer Lee W. Young, International Search Report and Written Opinion issued in PCT Application No. PCT/US2010/063127 dated Feb. 11, 2019.

Authorized Officer Shane Thomas, International Search Report issued in PCT Application No. PCT/US2017/050999 dated Nov. 27, 2017.

Authorized Officer: Lee W. Young, "International Search Report and Written Opinion" issued in counterpart International Patent Application No. PCT/US2015/010811, dated Sep. 16, 2015, Publisher: PCT.

George Porter et al., "Integrating microsecond circuit switching into the data center," in Proceedings of the ACM SIGCOMM 2013 conference on SIGCOMM, New York, NY, USA, Aug. 12, 2013, pp. 447-458.

Han et al., Large-scale silicon photonic switches with movable directional couplers, Apr. 2015 / Optica, pp. 370-375, vol. 2, No. 4.

He Liu et al., "Circuit Switching Under the Radar with REACToR," in Proceedings of the 11th USENIX Conference on Networked Systems Design and Implementation, Berkeley, CA, USA, Apr. 2, 2014, pp. 1-15.

Ken Tanizawa et al., "4×4 Si-wire optical path switch with off-chip polarization diversity," Opto-Electronics and Communications Conference (OECC), dated 2015, pp. 1-3.

Ken Tanizawa et al., "Silicon photonic 32×32 strictly-non-blocking blade switch and its full path characterization," in OptoElectronics and Communications Conference (OECC), dated 2016, 3 pp.

Nathan Farrington et al., "Helios: a hybrid electrical/optical switch architecture for modular data centers," ACM SIGCOMM Computer Communication Review, Aug. 30, 2010, pp. 339-350, vol. 41, No. 4.

Nathan L. Binkert et al., "Optical high radix switch design," "Micro IEEE", May 1, 2012, pp. 100-109, vol. 32, No. 3.

Non-Final Office Action received for U.S. Appl. No. 16/331,824, dated Dec. 19, 2019.

Notice of Allowance received for U.S. Appl. No. 15/109,761, dated Jun. 14, 2018, 5 pages.

Notice of Allowance received for U.S. Appl. No. 15/109,761, dated May 29, 2018, 8 pages.

Notice of Allowance received for U.S. Appl. No. 16/331,824, dated Apr. 1, 2020.

Sebastien Rumley et al., "Impact of photonic switch radix on realizing optical interconnection networks for exascale systems," Proc. of the IEEE Optical Interconnects Conference, dated 2014, pp. 98-99.

Shigeru Nakamura et al., "High extinction ratio optical switching independently of temperature with silicon photonic 1×8 switch," in Optical Fiber Communication Conference, dated 2012, 3 pp.

Tae Joon Seok et al., "Large-scale broadband digital silicon photonic switches with vertical adiabatic couplers," Optica, Jan. 1, 2016, pp. 64-70, vol. 3, No. 1.

Yuta Akihama et al., "Single and multiple optical switches that use freestanding silicon nanowire waveguide couplers", e16y; doi:10.1038/ISA.2012.16, "Light: Science & Applications (2012)", Jun. 22, 2012, Publisher: CIOMP, Published in: JP.

* cited by examiner

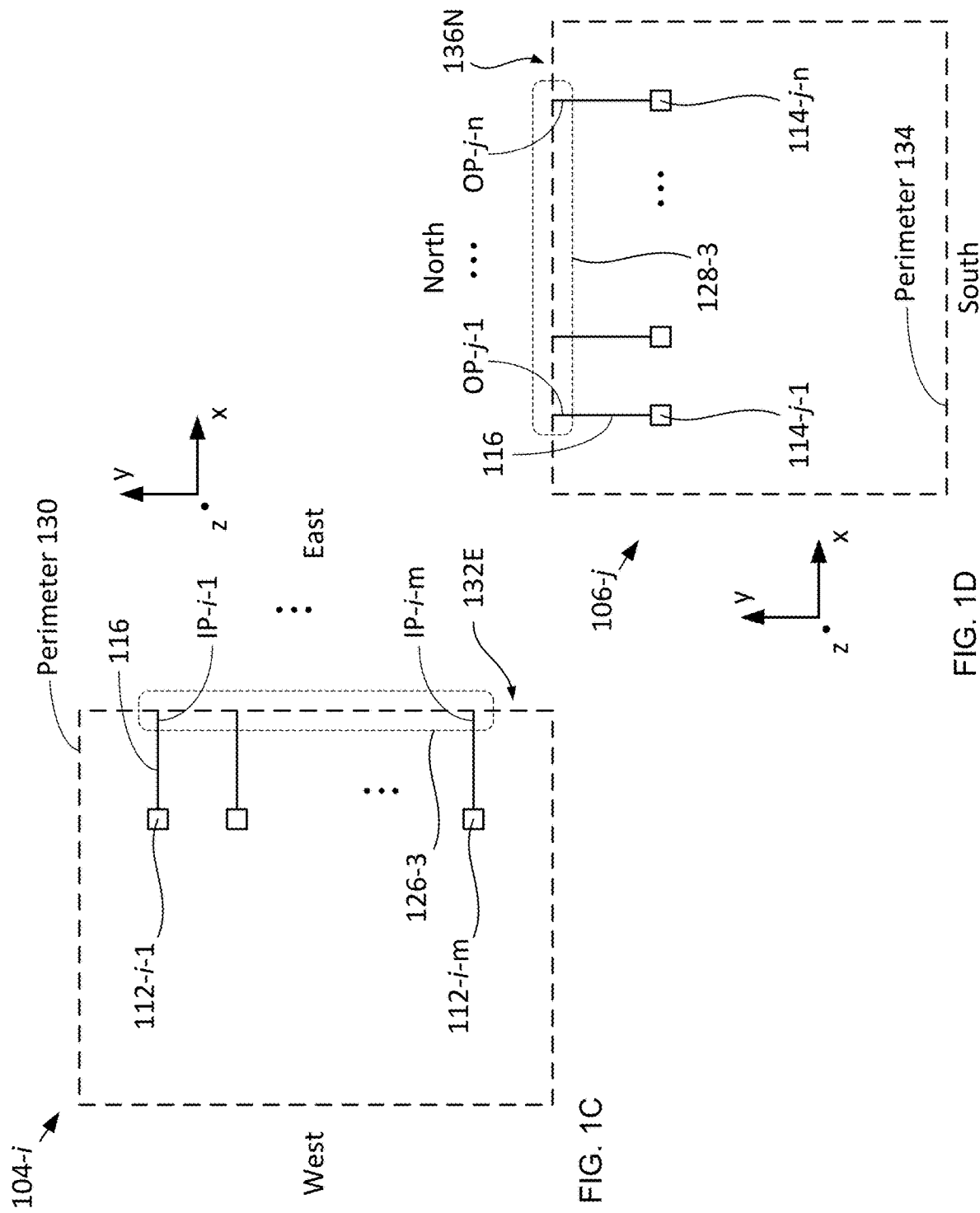

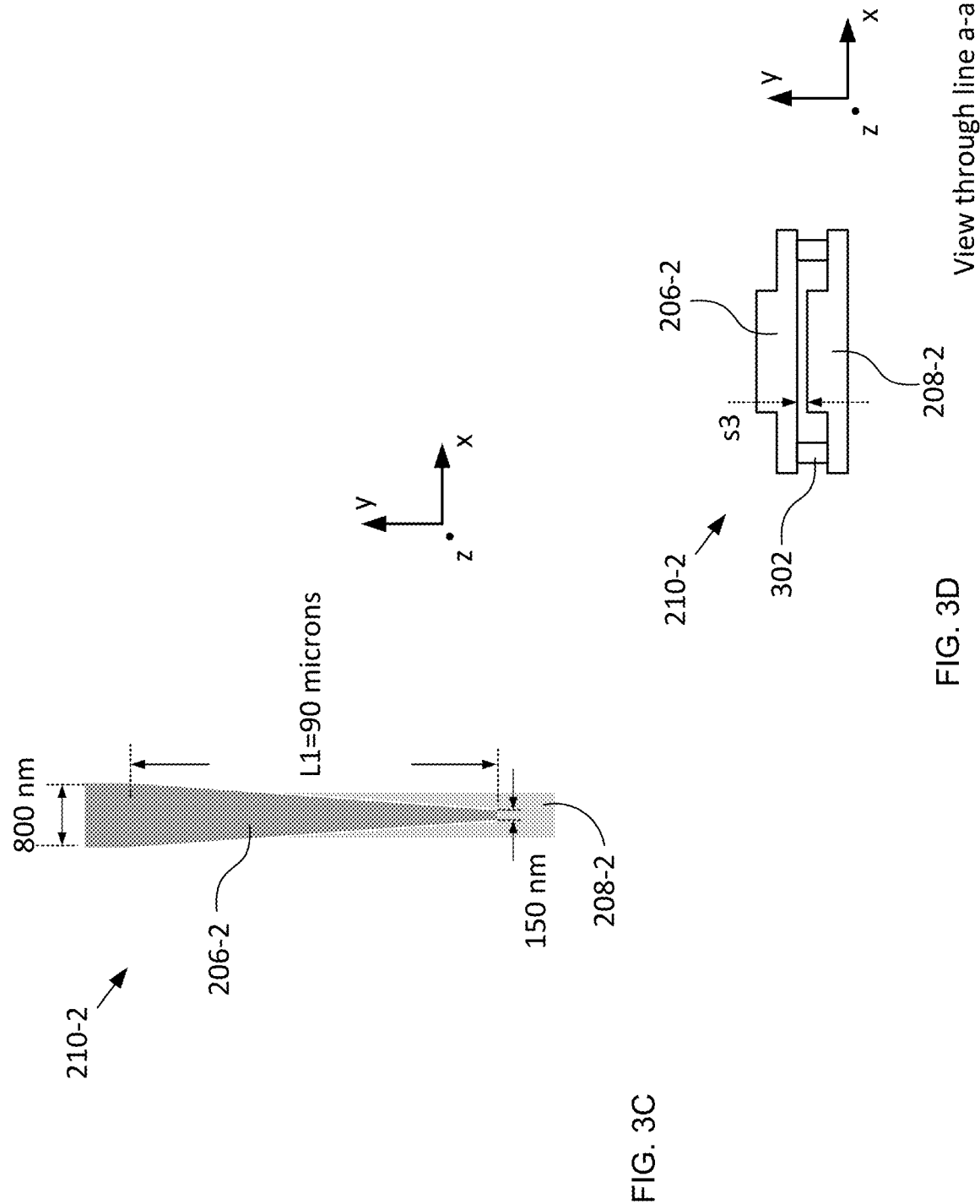

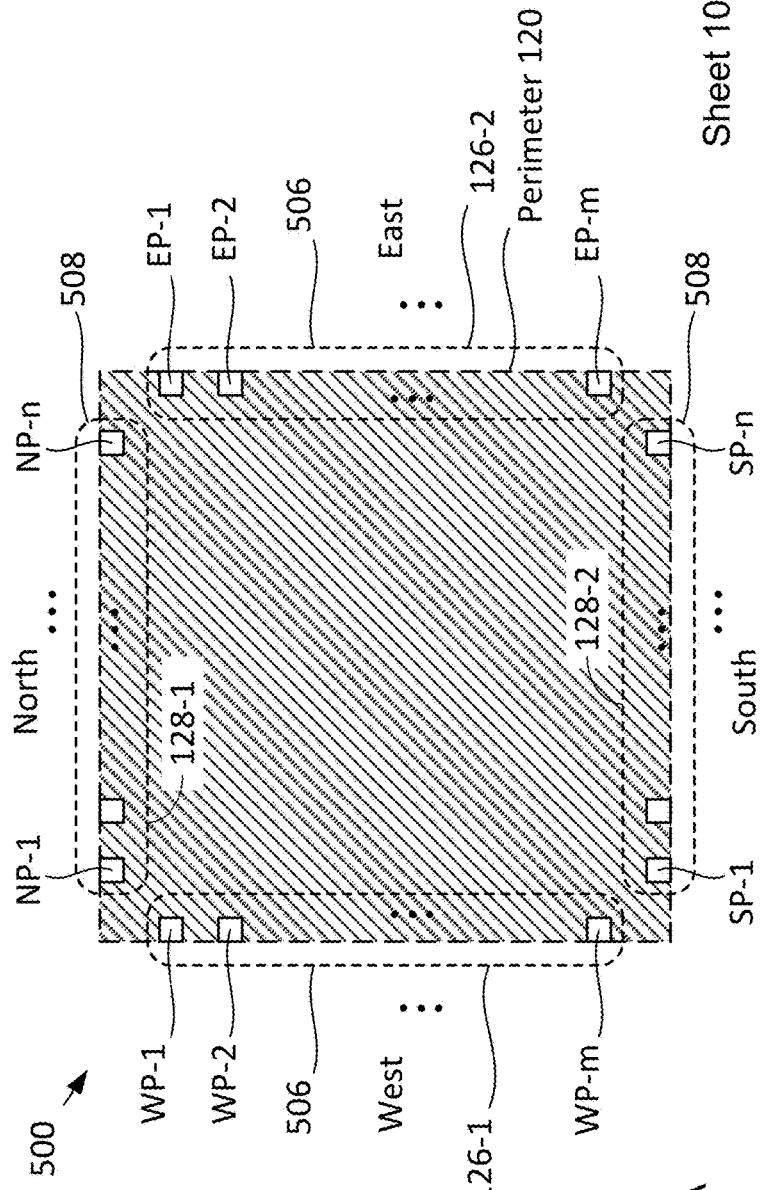
FIG. 5A
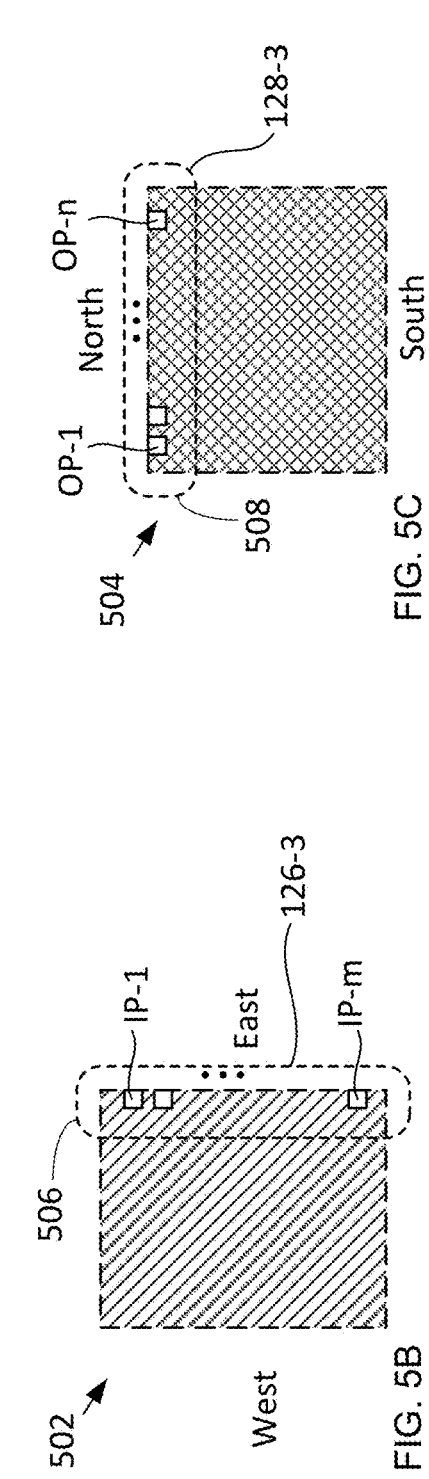
FIG. 5B
FIG. 5C

WAFER-SCALE-INTEGRATED SILICON-PHOTONICS-BASED OPTICAL SWITCHING SYSTEM AND METHOD OF FORMING

CROSS REFERENCE TO RELATED APPLICATIONS

This case is a continuation of U.S. Non-Provisional application Ser. No. 16/768,233, filed May 29, 2020, which is a national stage application of PCT Application No. PCT/US18/63127, filed Nov. 29, 2018, which claims the benefit of U.S. Provisional Application Ser. No. 62/592,815, filed Nov. 30, 2017, each which is incorporated herein by reference.

In addition, the following cases are also incorporated by reference:
  i. WO 2015/147966, published Oct. 1, 2015; and
  ii. WO 2018/049345, published Mar. 15, 2018.

STATEMENT REGARDING FEDERALLY SPONSORED RESEARCH

This invention was made with Government support under Grant No. HR0011-17-1-0001 awarded by the DOD/DARPA and Grant No. 0812072 awarded by the National Science Foundation (NSF). The Government has certain rights in the invention.

TECHNICAL FIELD

The present disclosure relates to optical communications networks in general, and, more particularly, to integrated-optics-based optical switches.

BACKGROUND

The explosive growth of cloud computing and big data applications has fueled an expansion of data centers. Unfortunately, as link rates have increased to 100 Gb/s and beyond, scaling of data center networks to support such expansion using conventional electronic switches has proven challenging because state-of-the-art electronic switches have limited throughput. For example, Broadcom's Tomahawk switch has a throughput of only 3.2 Tb/s, which realizes a switch radix of only 32 at 100 Gb/s. As a result, large numbers of switches are required to connect a data center, which gives rise to energy consumption, cost, and latency issues.

Optical networking technology has the potential for overcoming these challenges, however, as has already been demonstrated in the terrestrial telecommunications arena. Optical circuit switches, such as white-light cross-connects (OXC), wavelength-selective cross-connects (WXC), and reconfigurable optical add-drop multiplexers (ROADM) can reconfigure the path of an optical signal through a network without having to convert the signal from the optical domain into the electrical domain and back again. As a result, their use enables a reduction in the number of optical-electrical-optical (OEO) conversions required in a switching network and, therefore, can greatly reduce the number of costly and power-hungry 100G links.

To date, most conventional optical-circuit switches have been based on either MEMS mirrors or liquid-crystal-on-silicon (LCOS) elements, where the mirrors or LCOS elements control the optical path of each light signal through a three-dimensional free-space region between one or more input ports and a plurality of output ports. Unfortunately, conventional optical-circuit switch technology has proven difficult to extend to large-port-count OXCs. In addition, reconfiguration speed, wavelength sensitivity, and/or polarization sensitivity associated with such prior-art approaches are limiting factors in many applications.

In recent years, however, integrated-optics technology has matured to a point that it has become another viable candidate technology for use in optical-circuit switching systems. An integrated-optics system (a.k.a., photonic integrated circuit (PIC)) comprises one or more optical waveguides formed on the surface of a substrate, such as a silicon wafer, where the optical waveguides can be combined in myriad arrangements to provide complex optical functionality. Each "surface waveguide" includes a light-guiding core surrounded by cladding material that substantially confines the light signal to the core as the light propagates through the waveguide. Due to its compatibility with CMOS electronics, availability of large-scale substrates and volume foundries, etc., integrated-optics based on cores of single-crystal silicon (referred to, herein, as "silicon photonics") has become a dominant PIC technology—particularly for large-scale systems, such as high-port-count OXCs. Examples of silicon-photonic optical-circuit switches are disclosed, for example, by Han, et al., in "Large-scale silicon photonic switches with movable directional couplers," Optica, Vol. 2, pp. 1-6 (2015) and by Seok, et al., in "Large-scale broadband digital silicon photonic switches with vertical adiabatic couplers," Optica, Vol. 3, pp. 64-70 (2016), each of which is incorporated herein by reference.

Conventional CMOS processing is based on step-and-repeat photolithography, where, for each mask level of the fabrication process, a mask pattern is defined over the entire area of a substrate by sequentially projecting a small-area, high-resolution light pattern (referred to as a reticle) onto a series of different small areas of a photoresist layer formed on the substrate surface. Once all of these exposure fields have been exposed by the reticle, the photoresist layer is developed to remove unwanted photoresist and leave behind the desired composite mask pattern across the substrate surface.

Unfortunately, the position of the reticle at each exposure field cannot be controlled perfectly and the relative position between features in adjacent exposure fields can vary a great deal while still being within acceptable tolerances for integrated-circuit fabrication. As a result, significant misalignment between features in adjacent exposure fields can occur. While normally not a problem for CMOS integrated circuit production, this "stitching error" can give rise to very high optical loss in a surface waveguide that extends across multiple exposure fields.

In order to realize low-optical-loss performance (i.e., high performance), therefore, prior-art silicon-photonics-based optical switching systems are normally configured such that the entire switch fits within the maximum area of a single standard projection-lithography reticle (a few centimeters by a few centimeters), which has limited such prior-art switching systems to low port counts (i.e., small radix). To date, the highest port count of the switch that can fit inside a reticle is 128×128 [see K. Kwon et al., "128×128 Silicon Photonic MEMS Switch with Scalable Row/Column Addressing," in Conference on Lasers and Electro-Optics, paper SF1A.4, 2018, p. SF1A.4.]. To realize a 1024-port data center network, for example, nearly 64 such switches would be required. In addition, these systems have typically had high optical losses, which has limited their utility in many applications. To compensate for this optical loss, optical amplifiers are often required, greatly increasing overall system cost. In many cases, these drawbacks can more than offset the benefits of employing optical switching.

Examples of larger port-count switching systems have been reported in the prior art, where these systems are fabricated using wafer-scale contact lithography. Although contact lithography enables the entire surface area of a substrate to be patterned at one time, it is difficult, if not impossible to use it to form features having dimensions less than about one micron. As a result, the optical performance of such systems is poor.

The need for a large-radix, fast, low-loss optical switching technology remains, as yet, unavailable in the prior art.

SUMMARY

An advance in the art is made according to aspects of the present disclosure which describes wafer-scale-integrated, integrated-optics-based, large-port-count optical switching systems that encompass a substrate region whose area exceeds that of the maximum reticle size of the lithography equipment needed for defining its elements. Embodiments in accordance with the present specification are particularly well suited for use as optical switches in data centers, optical switches in optical-telecommunications networks, optical cross-connects, reconfigurable add-drop multiplexers, and the like.

Like optical switching systems known in the prior art, embodiments described herein employ silicon-photonics-based switch matrices that enable any input port to be optically coupled with any output port.

In sharp contrast to prior-art silicon-photonics-based switches, however, embodiments in accordance with the present disclosure are directly scalable to large port counts by tiling and stitching multiple substantially identical, switch blocks together, where (1) the reticle pattern for forming the switch block occupies an area that fits within that of a standard lithography reticle and (2) the waveguides of the switch block define waveguide ports located at the edges of the reticle, where the waveguide ports on opposite edges are arranged in the same arrangement. As a result, the same switch block reticle can be repeatedly patterned and stitched together over the usable area of the substrate to create a monolithically integrated, aggregate switching matrix that can be many times the maximum size of a standard lithography reticle. In fact, embodiments in accordance with the present disclosure are compatible with wafer-scale integration approaches that enable monolithically integrated switching systems that encompass the entire usable area of the substrate on which they are formed. Furthermore, large-port-count switch blocks in accordance with the present disclosure are fabricated such that they exhibit low propagation loss, which is substantially the same for any path through the switch block.

An illustrative embodiment in accordance with the present disclosure is a wafer-scale silicon-photonics-based switching system that is operative for controlling the path of optical signals between any of P input ports and Q output ports in non-blocking fashion, where the switching system occupies an area that is larger than that of a standard lithography reticle. The system includes an M×N array of monolithically integrated, identical sub-arrays. Each sub-array includes an m×n matrix of 2×2 optical crossbar switches (i.e., P=M*m and Q=N*n) that are interconnected by a network of bus waveguides. Some of the bus waveguides extend laterally across the sub-array between matching arrangements of m western ports and m eastern ports, and some of the bus waveguides extend vertically across the sub-array between matching arrangements of n northern ports and n southern ports. In some embodiments, the western, eastern, northern, and southern ports all have the same arrangement.

Since each switch block occupies an area that is less than or equal to the maximum reticle size of the lithography system used in the fabrication of the system, each constituent layer of the switch block can be defined using a single reticle. The complete system is realized by stitching the switch blocks together such that, in laterally adjacent switch blocks, the eastern ports of one sub-array are joined with the western ports of the other sub-array, while in vertically adjacent switch blocks, the southern ports of one sub-array are joined with the northern ports of the other sub-array.

In some embodiments, low-loss coupling regions are included at the junction of the bus waveguides of adjacent switch blocks to mitigate losses due to stitching error.

In some embodiments, electronic circuitry is monolithically integrated with a switching system. In some of these embodiments, the electronics includes circuit elements, such as CMOS devices, etc., which are monolithically integrated on the same substrate as the optical circuit switch. In some of these embodiments, the electronic circuitry includes circuit elements that are formed on a separate substrate, which is subsequently bonded to the optical circuit switch substrate, with or without an interposer.

An embodiment in accordance with the present disclosure is a monolithically integrated silicon-photonics-based optical switching system comprising: (1) a plurality of input ports (112-1,1 through 112-M,m); (2) a plurality of output ports (114-1,1 through 114-N,n); and (3) a plurality of switch blocks (102) that is arranged to collectively define a switching matrix (118), wherein each switch block is substantially identical and characterized by a first reticle pattern that is no larger than a lithography reticle, the first reticle pattern having a perimeter (120) that includes first (122W), second (122E), third (122N), and fourth (122S) edges, and wherein each switch block includes: a first plurality of bus waveguides (116), each extending between a first port (WP) at the first edge and a second port (EP) the second edge, wherein the plurality of first ports is arranged in a first arrangement that defines a first lateral interface (126-1), and wherein the plurality of second ports is arranged in the first arrangement to define a second lateral interface (126-2) that matches the first lateral interface; a second plurality of bus waveguides that extends between a third port (NP) at the third edge and a fourth port (SP) at the fourth edge, wherein the plurality of third ports is arranged in a second arrangement that defines a first vertical interface (128-1), and wherein the plurality of fourth ports is arranged in the second arrangement to define a second vertical interface (128-2) that matches the first vertical interface; and a plurality of switches (120), each switch being operatively coupled with a bus waveguide of the first plurality thereof and a bus waveguide of the second plurality thereof; wherein the first pluralities of bus waveguides of each laterally abutting switch-block pair are joined via a pair of lateral interfaces; wherein the second pluralities of bus waveguides of each vertically abutting switch-block pair are joined via a pair of vertical interfaces; wherein the plurality of switch blocks is arranged such that the switch matrix is operative for optically coupling any input port of the plurality thereof with any output port of the plurality thereof; and wherein the switching matrix is larger than the lithography reticle.

Another embodiment in accordance with present disclosure is a method for forming a monolithically integrated silicon-photonics-based optical switching system, the method comprising: (1) providing a first lithography reticle (500) operative for patterning a switch block (102), wherein the first lithography reticle defines a first reticle pattern that has a first perimeter (120) that includes first (122W), second (122E), third (122N), and fourth (122S) edges, and wherein the switch block includes: (a) a first plurality of bus waveguides (116), each extending between a first port (WP) at the first edge and a second port (EP) the second edge, wherein the plurality of first ports is arranged in a first arrangement that defines a first lateral interface (126-1), and wherein the plurality of second ports is arranged in the first arrangement to define a second lateral interface (126-2) that matches the first lateral interface; (b) a second plurality of bus waveguides that extends between a third port (NP) at the third edge and a fourth port (SP) at the fourth edge, wherein the plurality of third ports is arranged in a second arrangement that defines a first vertical interface (128-1), and wherein the plurality of fourth ports is arranged in the second arrangement to define a second vertical interface (128-2) that matches the first vertical interface; and a plurality of switches (120), each switch being operatively coupled with a bus waveguide of the first plurality thereof and a bus waveguide of the second plurality thereof; and (2) forming a plurality of switch blocks, each sub-array being based on the first lithography reticle and being formed in a different first exposure field (602) of a plurality thereof such that the plurality of first reticle patterns are stitched together to define a switch matrix (118) that is operative for optically coupling any input port (112) of a first plurality of input ports with any output port (114) of a first plurality of output ports; wherein the switching matrix is larger than the first lithography reticle.

BRIEF DESCRIPTION OF THE DRAWINGS

FIG. 1C depicts a schematic drawing of representative input-coupler block 104-i.

FIG. 1D depicts a schematic drawing of representative output-coupler block 106-j.

FIG. 3C depicts a schematic drawing of a top view of directional coupler 210-2.

FIG. 3D depicts a schematic drawing of a sectional view of directional coupler 210-2.

FIG. 5A depicts a simplified block diagram of a reticle suitable for the formation of each of switch blocks 102-1,1 through 102-M,N.

FIG. 5B depicts a simplified block diagram of a reticle suitable for the formation of each of input-coupler blocks 104-1 through 104-M.

FIG. 5C depicts a simplified block diagram of a reticle suitable for the formation of each of output-coupler blocks 106-1 through 106-N.

DETAILED DESCRIPTION

As noted above, prior-art silicon-photonic-based optical switching systems are limited to low port counts by their need to fit completely within the area of a standard lithography reticle. The teachings of the present disclosure enable switching systems whose size can be larger than the size of a standard lithography reticle by forming multiple copies of a switch block whose size is no larger than the size of the standard lithography reticle, where the reticle pattern is configured such that waveguides terminating at opposite edges of the pattern are arranged in the same way. As a result, the waveguides of laterally adjacent switch blocks, as well as vertically adjacent switch blocks, are readily stitched together to form an aggregate switching matrix larger than can be formed in the prior art.

Furthermore, by segmenting the switching system into multiple, identical switch blocks, only one reticle is required to define the complete switching matrix, thereby enabling lower cost fabrication.

It should be noted that fabrication of the elements of a switching system in accordance with the present disclosure typically requires multiple depositions of constituent layers, each of which is subsequently patterned using a different lithography mask layer having a layout that corresponds to the layer to be patterned. For the purposes of this disclosure, including the appended claims, a "reticle" is defined as the complete set of mask layers required to form an element (i.e., a switch block, an input-coupler block, or an output-coupler block) during the fabrication of system 100 using a conventional step-and-repeat lithography method. Furthermore, the term "reticle pattern" is defined as the entire pattern that results from the complete mask set. It should be noted that some mask layers of a reticle do not extend over the entire area defined by the perimeter of the reticle pattern.

It should also be noted that directional indicators, as used within this Specification, are provided merely to aid in the understanding of the relationships between elements described herein and should not be viewed as limiting to the scope of the present disclosure. In other words, terms such as "north," "south," "left," "right," etc., are merely illustrative.

Figure 1A:
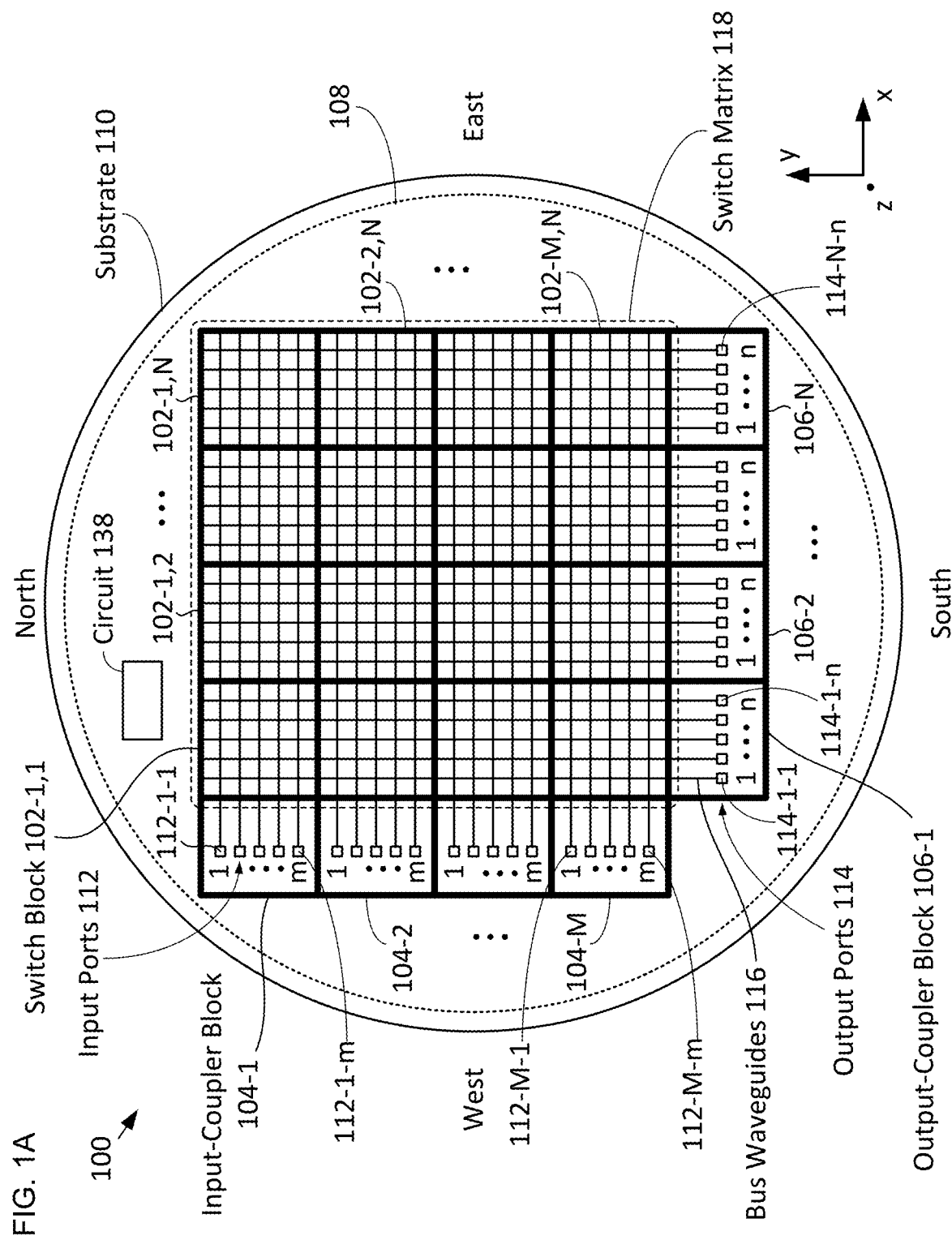
FIG. 1A depicts a simplified schematic drawing of an illustrative optical switching system in accordance with the present disclosure.

FIG. 1A depicts a simplified schematic drawing of an illustrative optical switching system in accordance with the present disclosure. System 100 is a monolithically integrated, wafer-scale silicon-photonics-based optical switch that occupies an area that exceeds that of a standard reticle used in step-and-repeat lithography. System 100 includes switch blocks 102-1,1 through 102-M,N, input-coupler blocks 104-1 through 104-M, output-coupler blocks 106-1 through 106-N, and circuit 138. System 100 is a large-port-count (i.e., 100) optical switch configured to enable low-loss optical connection between any input port 112 and any output port 114.

In the depicted example, switch blocks 102-1,1 through 102-M,N (referred to, collectively, as switch blocks 102), input-coupler blocks 104-1 through 104-M (referred to, collectively, as input-coupler blocks 104), and output-coupler blocks 106-1 through 106-N (referred to, collectively, as output-coupler blocks 106) are formed on substrate 110 using conventional CMOS fabrication methods; however, a wide range of suitable integrated-optics-fabrication techniques can be used in accordance with the present disclosure. Non-limiting, exemplary methods for forming the elements of system 100 are disclosed in U.S. Patent Publication 20030108290 and International Patent Application Serial Number PCT/US2017/050999, each of which is incorporated herein by reference.

Substrate 110 is a conventional substrate suitable for use in planar-processing fabrication. In the depicted example, substrate 110 is a conventional round silicon wafer suitable for use in CMOS fabrication; however, a wide range of substrate materials (e.g., silicon-on-insulator (SOI), glasses, silicon carbide, silicon germanium, compound semiconductors, composite materials, etc.) and/or shapes (e.g., square, rectangular, irregular, etc.) can be used without departing from the scope of the present disclosure.

Circuit 138 includes electronic circuitry for controlling the state of each of the switches in system 100, among other functions. For clarity, the electrical connectivity between circuit 138 and the switches of system 100 are not shown. In the depicted example, circuit 138 is a conventional CMOS circuit that is monolithically integrated with system 100 on substrate 110. In some of embodiments, circuit 138 includes circuit elements that are formed on a separate substrate, which is subsequently bonded to the optical circuit switch substrate, with or without an interposer.

Each of switch blocks 102 is an m×n array of substantially identical silicon-photonic 2×2 optical switches optically interconnected by a network of bus waveguides 116 that are configured to mate with the bus waveguides of adjacent switch blocks, an input-coupler block, and/or an output-coupler block. As a result, system 100 has P input ports (where P=M*m) and Q output ports (where Q=N*n). It should be noted that any practical number of rows and/or columns of switches can be included in each of switch blocks 102 without departing from the scope of the present disclosure.

Figure 1B:
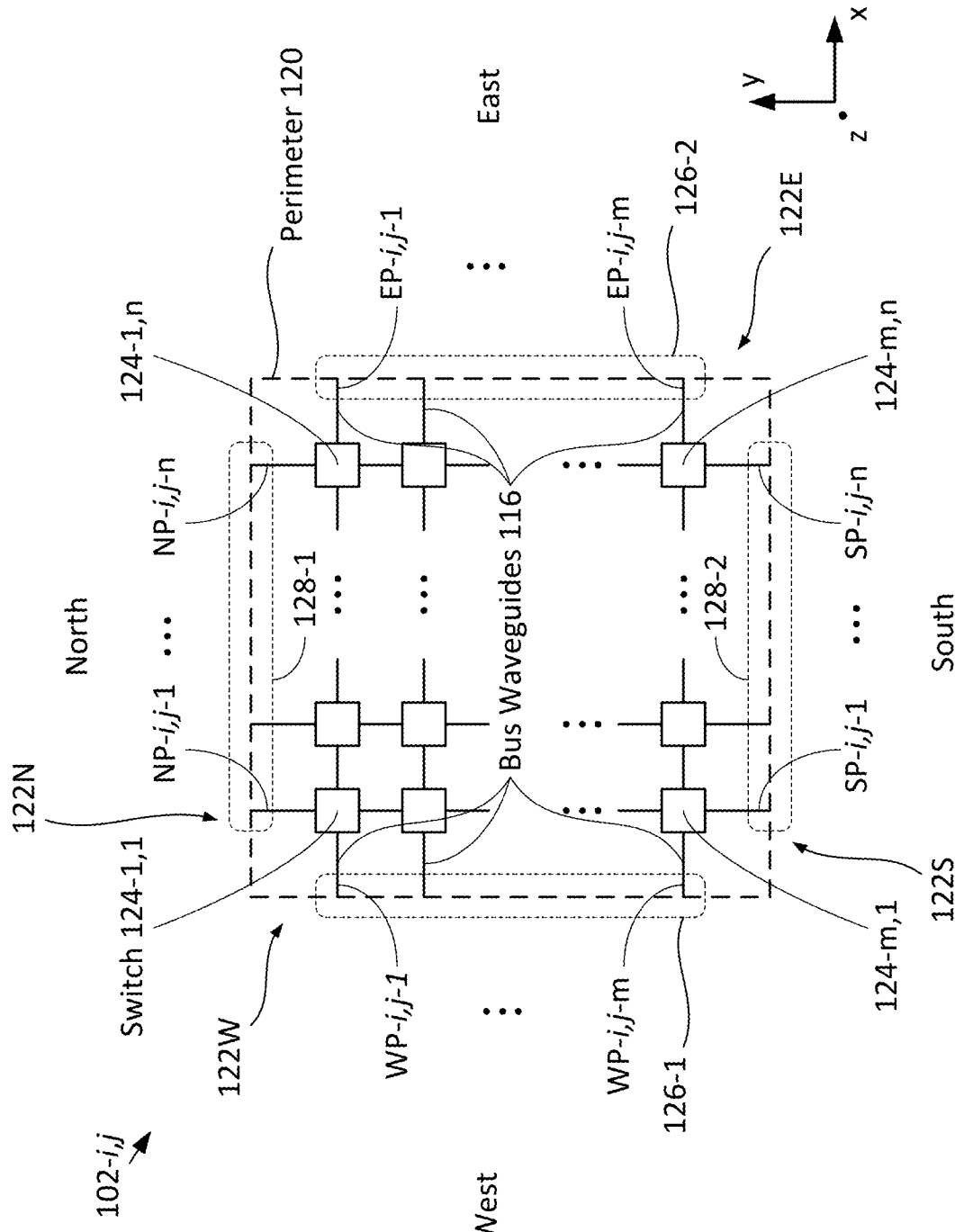
FIG. 1B depicts a schematic drawing of representative switch block 102-i,j, wherein 1≤i≤M and 1≤j≤N.

FIG. 1B depicts a schematic drawing of representative switch block 102-$i,j$, where $1 \leq i \leq M$ and $1 \leq j \leq N$. Switch block 102-$i,j$ includes substantially identical switches 124-1,1 through 124-$m,n$ (referred to, collectively, as switches 124) which are optically coupled via bus waveguides 116. Switch block 102-$i,j$ is configured such that it fits completely within perimeter 120, which defines an area that fits within a standard lithography reticle. Perimeter 120 includes west edge 122W, north edge 122N, east edge 122E, and south edge 122S.

In the depicted example, each of switches 124 is a 2×2 optical crossbar switch that, depending on the actuation state of the switch, enables a light signal entering its western port to propagate to either of its eastern and southern ports, and a light signal entering its northern port to propagate to either of its southern and eastern ports. In its unactuated state, a light signal entering the western port of switch 124 propagates to its eastern port while a light signal entering the northern port of switch 124 propagates to its southern port. Switch 124, and its operation, is described in more detail below and with respect to FIGS. 2A-B and 3A-B. In some embodiments, at least one of switches 124 is a 1×2 optical switch that directs a light signal entering its western port to either its eastern port or southern port, depending on the actuation state of the switch.

Each of bus waveguides 116 is a silicon-rib waveguide having a rib height of approximately 60 nm and a width of approximately 800 nm. It should be noted that other dimensions and/or waveguide structures (e.g., channel waveguides, stripe waveguides, etc.) can be used for bus waveguides 116 without departing from the scope of the present disclosure. Furthermore, although the depicted example includes bus waveguides whose core is silicon, a wide range of materials can be used in a bus waveguide without departing from the scope of the present disclosure. Materials suitable for use in bus waveguide 116 within the scope of the present disclosure include, without limitation, silicon, silicon compounds (e.g., silicon carbide, silicon germanium, etc.), other semiconductors (e.g., germanium, III-V compound semiconductors, II-VI compound semiconductors, etc.), glasses, silicon nitride, silicon oxynitride, and the like.

In some embodiments, bus waveguides 116 are dimensioned and arranged to enable propagation of light signals that include both TE- and TM-polarization components such that each of these polarization components exhibits low propagation loss and the losses of the different polarization modes are substantially equal. Furthermore, the propagation loss for each polarization mode in embodiments in accordance with the present disclosure is typically substantially port-independent (i.e., all routes through the system have substantially the same loss).

In the depicted example, laterally oriented bus waveguides of switch block 102-$i,j$ extend between waveguide ports WP-i,j-1 through WP-i,j-m and waveguide ports EP-i,j-1 through EP-i,j-m, located at west edge 122W and east edge 122E, respectively. In similar fashion, vertically oriented bus waveguides of switch block 102-$i,j$ extend between waveguide ports NP-i,j-1 through NP-i,j-n and waveguide ports SP-i,j-1 through SP-i,j-n, located at north edge 122N and south edge 122S, respectively.

Waveguide ports WP-i,j-1 through WP-i,j-m and waveguide ports EP-i,j-1 through EP-i,j-m are arranged in a first arrangement that defines matching lateral interfaces 126-1 and 126-2, respectively.

In similar fashion, waveguide ports NP-i,j-1 through NP-i,j-n and waveguide ports SP-i,j-1 through SP-i,j-n are arranged in a second arrangement that defines matching vertical interfaces 128-1 and 128-2, respectively. By providing switch block 102 such opposite edges have matching waveguide interfaces, laterally or vertically adjacent switch blocks can be readily stitched together without regard to where they reside within switch matrix 118. As a result, switch matrix 118 can be made any desired size that fits within area 108 using only one reticle.

FIG. 1C depicts a schematic drawing of representative input-coupler block 104-$i$. Input-coupler block 104-$i$ includes input ports 112-$i$-1 through 112-$i$-$m$, bus waveguides 116, and waveguide ports IP-i-1 through IP-i-m. Input-coupler block 104-$i$ is configured such that it fits completely within perimeter 130, which occupies an area that fits within a standard lithography reticle.

Each of input ports 112-$i$-1 through 112-$i$-$m$ (referred to, collectively, as input ports 112) is an optical coupler that enables optically coupling between its respective bus waveguide 116 and an external element, such as an optical fiber, optical source, and the like. In the depicted example, each of input ports 112 is a grating coupler; however, other coupling elements (e.g., edge couplers, etc.) can be used without departing from the scope of the present disclosure.

Bus waveguides 116 of input-coupler block 104-$i$ terminate at waveguide ports IP-i-1 through IP-i-m, which are located at east edge 132E of the input-coupler block and arranged in the first arrangement to define lateral interface 126-3, which matches lateral interface 126-1. As a result, the waveguide ports of input-coupler block 104-*i* can be readily joined to western ports WP-i,1-1 through WP-i,1-*m* of switch block 102-*i*,1.

FIG. 1D depicts a schematic drawing of representative output-coupler block 106-*j*. Output-coupler block 106-*j* includes output ports 114-*j*-1 through 114-*j*-*n*, bus waveguides 116, and waveguide ports OP-j-1 through OP-j-n. Output-coupler block 106-*j* is configured such that it fits completely within perimeter 130, which occupies an area that fits within a standard lithography reticle.

Each of output ports 114-*j*-1 through 114-*j*-*n* (referred to, collectively, as output ports 114) is an optical coupler that enables optically coupling between its respective bus waveguide 116 and an external element, such as an optical fiber, optical detector, and the like. In the depicted example, each of output ports 114 is a grating coupler; however, other coupling elements (e.g., edge couplers, etc.) can be used without departing from the scope of the present disclosure.

Bus waveguides 116 of output-coupler block 106-*j* terminate at waveguide ports OP-j-1 through OP-j-n, which are located at north edge 136N of the output-coupler block and arranged in the first arrangement to define vertical interface 128-3, which matches vertical interface 128-2. As a result, the waveguide ports of output-coupler block 106-*j* can be readily joined to southern ports SP-i,j-1 through SP-i,j-n of switch block 102-M,j.

Figure 2A:
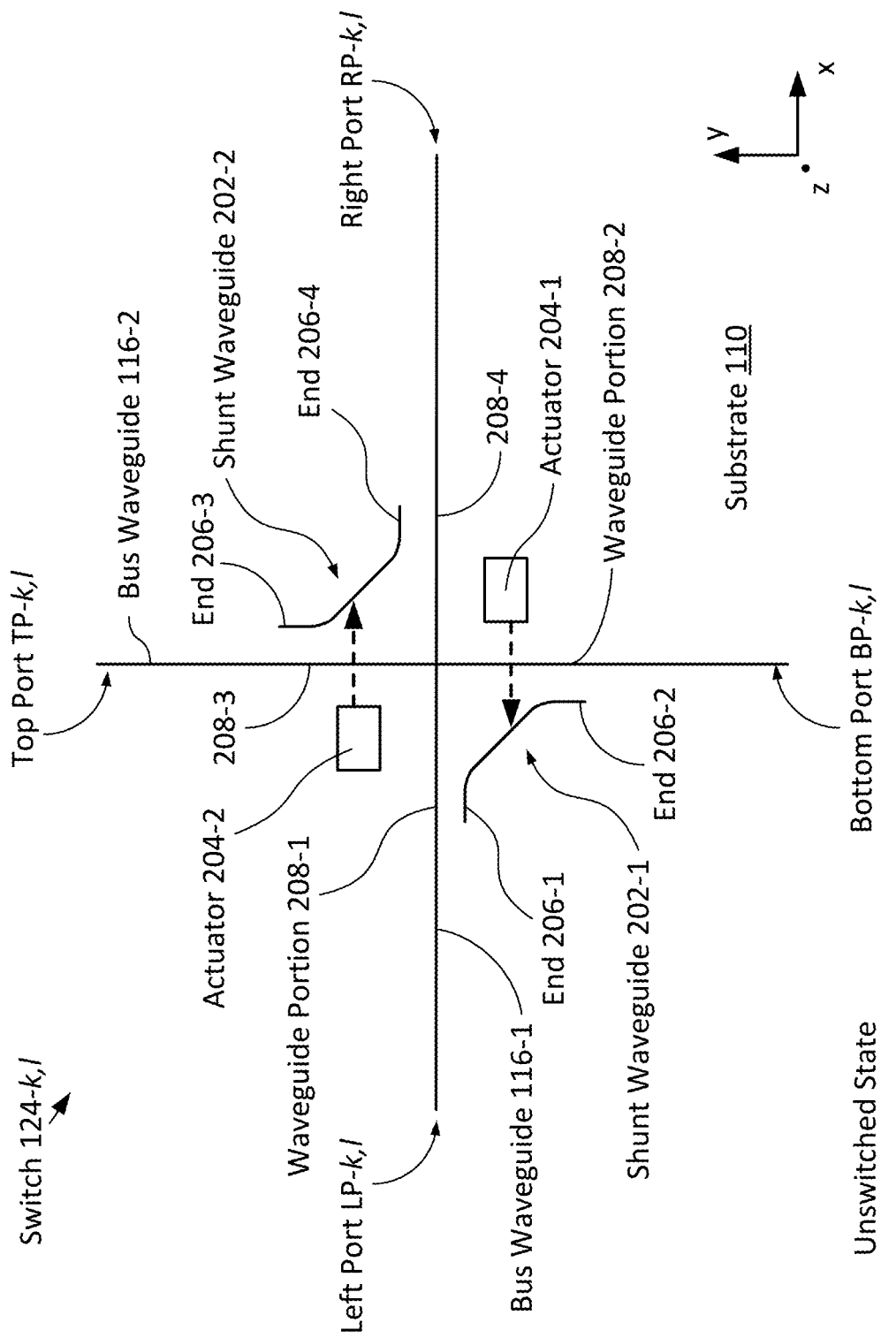
FIGS. 2A-B depict simplified schematic drawings of a switch in accordance with the illustrative embodiment, in its unswitched and switched states, respectively.
Figure 2B:
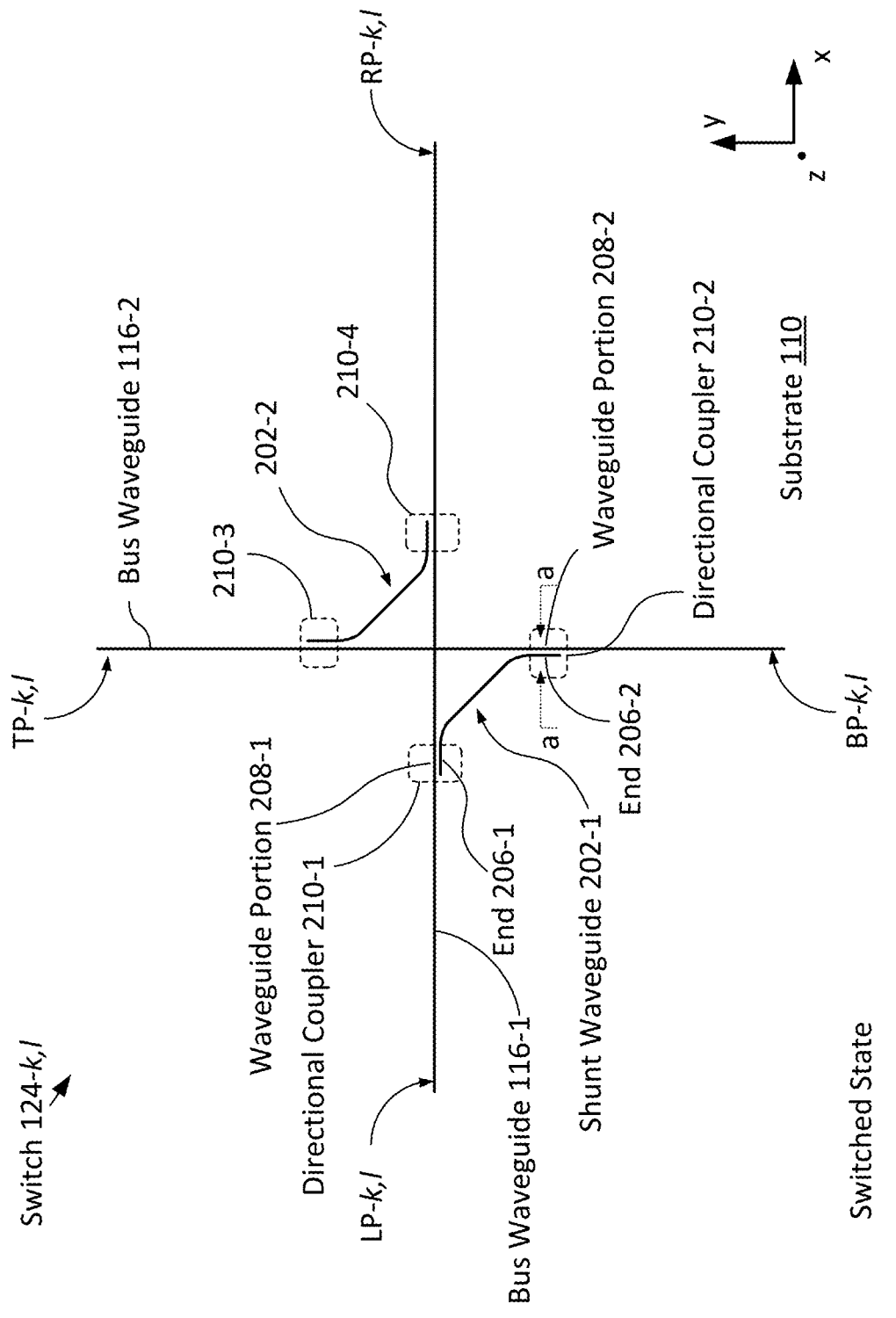

FIGS. 2A-B depict simplified schematic drawings of a switch in accordance with the illustrative embodiment, in its unswitched and switched states, respectively. Switch 124-*k,l*, wherein 1<k<m and 1<l<n, is representative of each of switches 124 in switch block 102. Switch 124-*k,l* includes bus waveguides 116-1 and 116-2, shunt waveguides 202-1 and 202-2, and actuators 204-1 and 204-2.

Figure 3A:
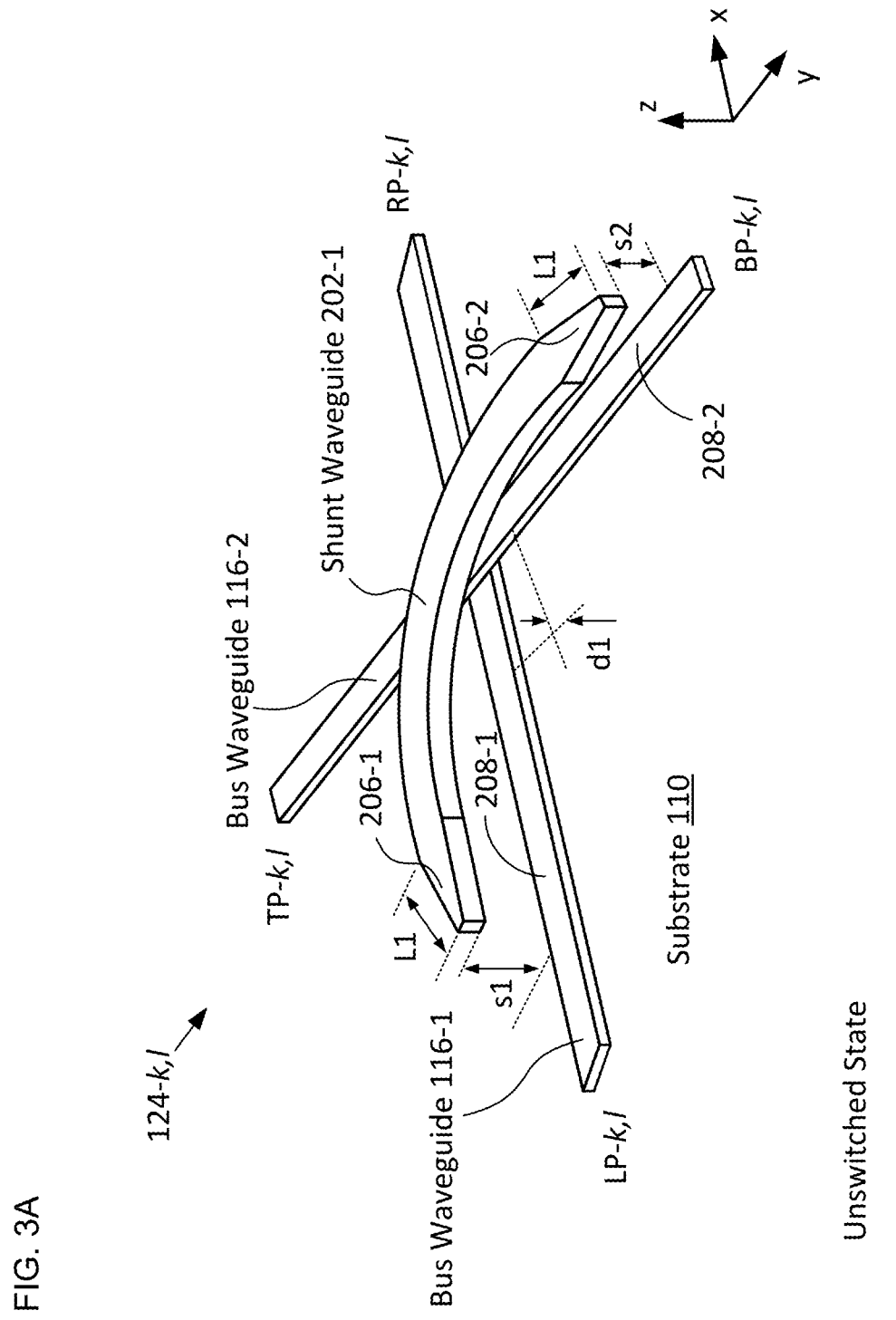
FIGS. 3A-B depict more detailed views of switch 124-k,l in its unswitched and switched positions, respectively.
Figure 3B:
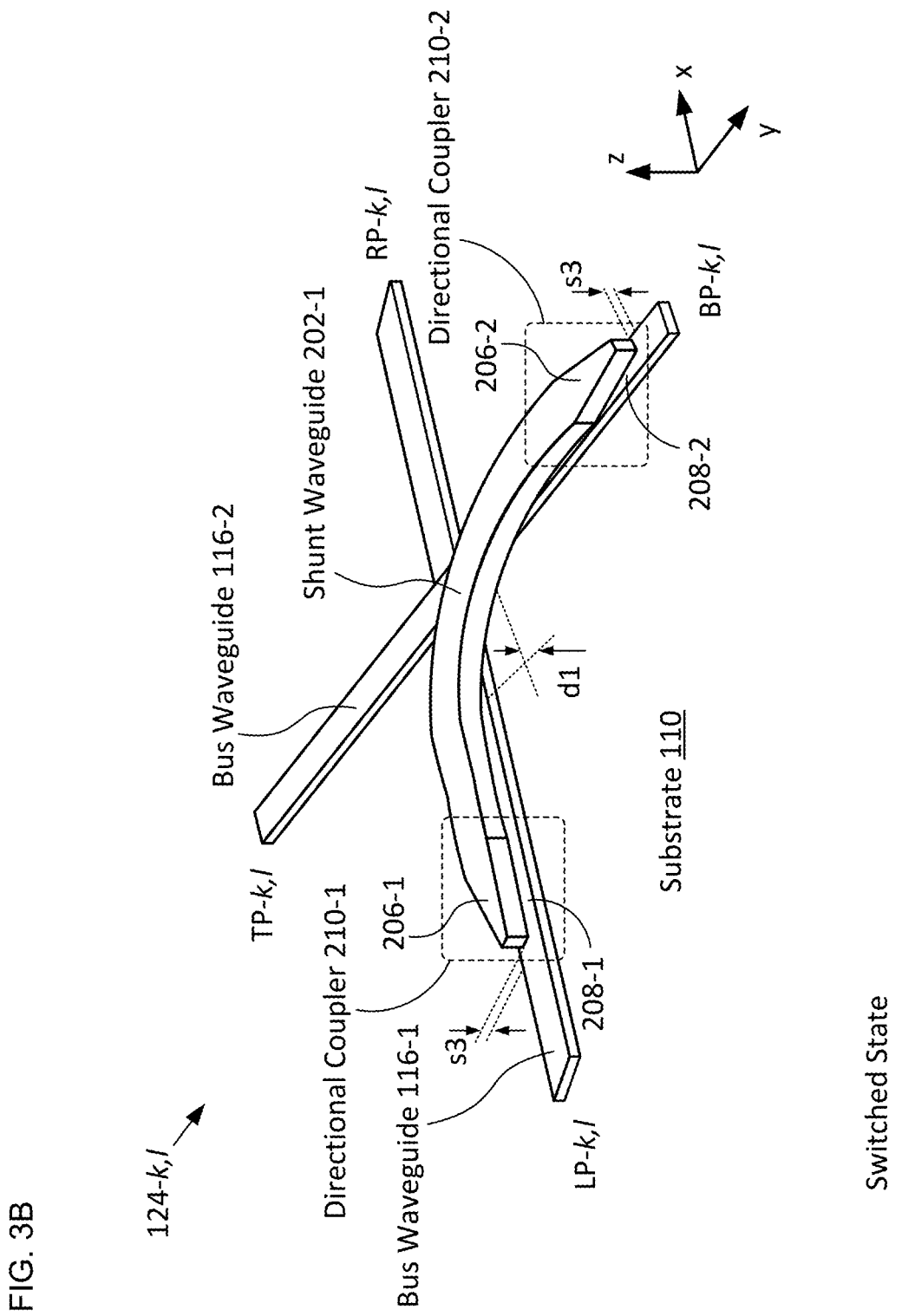

FIGS. 3A-B depict more detailed views of switch 124-*k,l* in its unswitched and switched positions, respectively. For clarity, actuators 204-1 and 204-2 are not shown in FIGS. 2B and 3A-B and shunt waveguide 202-2 is not shown in FIGS. 3A-B.

Bus waveguides 116-1 and 116-2 are disposed on substrate 110 such that each bus waveguide resides at a different height above the substrate surface. As a result, bus waveguides 116-1 and 116-2 are not optically coupled when the switch is in its quiescent state. For the purposes of this Specification, including the appended claims, the term "disposed on" is defined as "exists on or above" an underlying material or layer. In switch 124-*k,l*, bus waveguide 116-1 extends from left port LP-k,l to right port RP-k,l and bus waveguide 116-2 extends from top port TP-k,l to bottom port BP-k,l.

It should be noted that, for each switch block 102-*i,j*:
i. left ports LP-1,1 through LP-m,1 of switches 124-1,1 through 124-*m*,1 function as waveguide ports WP-i, j-1 through WP-i,j-m of the switch block;
ii. right ports RP-1,*n* through RP-m,n of switches 124-1,*n* through 124-*m,n* function as waveguide ports EP-i,j-1 through EP-i,j-m of the switch block;
iii. top ports TP-1,1 through TP-1,*n* of switches 124-1,1 through 124-1,*n* function as waveguide ports NP-i,j-1 through NP-i,j-n of the switch block; and
iv. bottom ports BP-1,1 through BP-1,*n* of switches 124-*m*,1 through 124-*m,n* function as waveguide ports SP-i, j-1 through SP-i,j-n of the switch block.

Each of shunt waveguides 202-1 and 202-2 is a ridge waveguide that is analogous to bus waveguide 116; however, shunt waveguides 202-1 and 202-2 are movable relative to substrate 110. Furthermore, shunt waveguide 202-1 includes a curved portion that enables ends 206-1 and 206-2 to align with waveguide portions 208-1 and 208-2 of bus waveguides 116-1 and 116-2, respectively. In similar fashion, shunt waveguide 202-2 includes a curved portion that enables ends 206-3 and 206-4 to align with waveguide portions 208-3 and 208-4 of bus waveguides 116-2 and 116-1, respectively.

In the depicted example, each of shunt waveguides 202-1 and 202-2 comprises polysilicon; however, other materials can be used for a shunt waveguide without departing from the scope of the present disclosure. Preferably, the curved portion of each shunt waveguide is configured to operate as a single-mode waveguide for the light signals that propagate through switching system 100. Single-mode operation is preferred for this portion to mitigate bending losses through its 90° bend.

Shunt waveguides 202-1 and 202-2 are operatively coupled with actuator 204-1 and 204-2, respectively, each of which is a micromechanical actuator operative for moving the shunt waveguide between a first position in which it is optically decoupled from both bus waveguides and a second position in which its ends are optically coupled with portions of both bus waveguides to define a pair of adiabatic directional couplers.

Actuators 204-1 and 204-2 are MEMS-based vertical electro-static actuators that are mechanically coupled with their respective shunt waveguide to control the position of ends 206-1 and 206-2 relative to waveguide portions 208-1 and 208-2 and ends 206-3 and 206-4 relative to waveguide portions 208-3 and 208-4. For clarity, the vertical separation between ends 206 and waveguide portions 208 is represented as a lateral separation in FIGS. 2A-B. Examples of electro-static actuators suitable for use in accordance with the present disclosure are described in detail in PCT Publication WO201849345, which is incorporated herein by reference.

Although the illustrative embodiment comprises a vertical electrostatic actuator, it will be clear to one skilled in the art, after reading this Specification, how to specify, make, and use any actuator suitable for controlling the separation between the ends of a shunt waveguide and their respective waveguide portions. Actuators suitable for use in the present invention include, without limitation, vertical actuators, lateral actuators, and actuators that actuate both vertically and laterally. Further, actuators in accordance with the present invention include, without limitation, electrothermal, thermal, magnetic, electromagnetic, electrostatic comb-drive, magnetostrictive, piezoelectric, fluidic, pneumatic actuators, and the like.

Bus waveguides 116-1 and 116-2 are preferably formed in different planes such that they are optically isolated from one another when the switching cell is in its unswitched state. As a result, embodiments of the present invention avoid polarization-dependent crossing loss at junctions between bus waveguides formed in the same waveguide layer, as occurs in prior-art optical switching systems. In the depicted example, bus waveguides 116-1 and 116-2 are separated by distance dl, which is equal to approximately 1.38 micron. As a result, the separation between the top surface of bus waveguide 116-1 and the bottom surface of bus waveguide 116-2 is approximately 1 micron.

It should be noted that, although it is normally preferable for bus waveguides 116-1 and 116-2 to lie in different planes, in some embodiments, the bus waveguides are formed in the same plane. In some of these embodiments, the bus waveguides cross at a crossing region that includes a multi-mode interference (MMI) region to reduce loss due to scattering, etc. at the junction between the bus waveguides.

When switch 124-k,l is in its unswitched state (FIGS. 2A and 3A), ends 206 are separated from waveguide portions 208 by distances sufficiently large to ensure that no evanescent coupling occurs between them. In this state, left port LP-k,l is optically coupled with right port RP-k,l and top port TP-k,l is optically coupled with bottom port BP-k,l. In other words, light entering the switch at LP-k,l will propagate directly to RP-k,l with low loss, while light entering the switch at TP-k,l will propagate directly to BP-k,l with low loss.

When switch 124-k,l is in its switched state (FIGS. 2B and 3B), end 206-1 and waveguide portion 208-1 collectively define adiabatic directional coupler 210-1, end 206-2 and waveguide portion 208-2 collectively define adiabatic directional coupler 210-2, end 206-3 and waveguide portion 208-3 collectively define adiabatic directional coupler 210-3, and end 206-4 and waveguide portion 208-4 collectively define adiabatic directional coupler 210-4. As a result, a light signal entering LP-k,l evanescently couples into shunt waveguide 202-1 at directional coupler 210-1 and propagates through shunt waveguide 202-1 to directional coupler 210-2, where it evanescently couples into bus waveguide 116-2 and propagates to BP-k,l. In similar fashion, a light signal entering TP-k,l evanescently couples into shunt waveguide 202-2 at directional coupler 210-3 and propagates through shunt waveguide 202-2 to directional coupler 210-4, where it evanescently couples into bus waveguide 116-1 and propagates to RP-k,l.

FIG. 3C depicts a schematic drawing of a top view of directional coupler 210-2.

In the depicted example, each of ends 206-1 through 206-4 tapers from a width of approximately 800 nm to a width of approximately 150 nm at its tip over a length, L1, of 90 microns. In some embodiments, at some of ends 206-1 through 206-4 are tapered differently to accommodate differences in waveguide portions 208-1 and 208-2, respectively, which enables both TE- and TM-modes of light to efficiently couple through adiabatic couplers 210-1 through 210-4.

FIG. 3D depicts a schematic drawing of a sectional view of directional coupler 210-2. The sectional view shown in FIG. 3D is taken through line a-a of FIG. 2B.

As depicted in FIG. 3D, switch 124 includes stand-offs 302 that form a mechanical stop between shunt waveguide 202-1 and each of bus waveguides 116-1 and 116-2 when the shunt waveguide is in its switched position. In the depicted example, stand-offs 302 are formed on the top of waveguide portions 208-1 and 208-2; however, stand-offs 302 can be disposed on the bottom of shunt waveguide 202-1 or in any other position in which they can establish separation, s3, between the shunt and bus waveguides.

Figure 4:
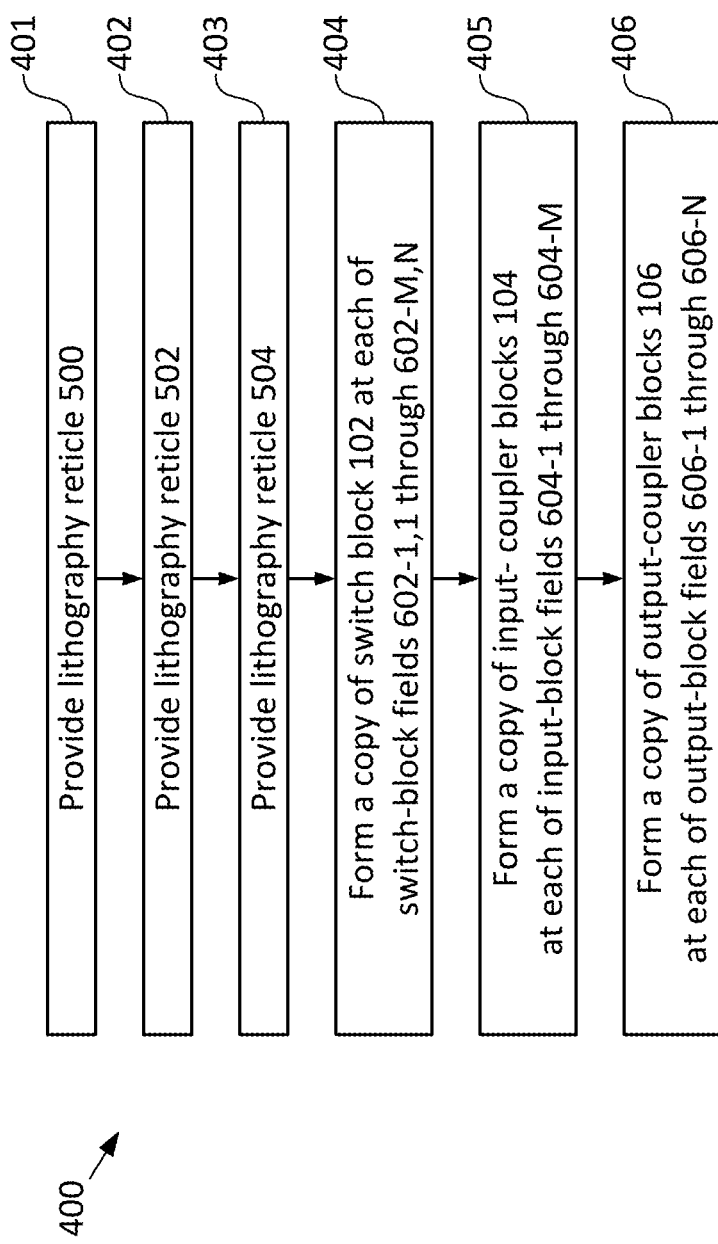
FIG. 4 depicts operations of a method suitable for forming an optical switching system in accordance with the illustrative embodiment.

FIG. 4 depicts operations of a method suitable for forming an optical switching system in accordance with the illustrative embodiment. Method 400 is described herein with continued reference to FIGS. 1-3, as well as reference to FIGS. 5-7.

Method 400 begins with operation 401, wherein a reticle for switch block 102 is provided.

FIG. 5A depicts a simplified block diagram of a reticle suitable for the formation of each of switch blocks 102-1,1 through 102-M,N.

Reticle 500 is a conventional reticle suitable for use in a step-and-repeat projection lithography process. As discussed above, reticle 500 includes a reticle pattern that includes all mask levels required for the formation of a switch block 102; however, for clarity, only the waveguide ports of lateral interfaces 126-1 and 126-2 and vertical interfaces 128-1 and 128-2 are indicated in FIG. 5A. The reticle pattern of reticle 500 has the same perimeter as that of switch block 102 (i.e., perimeter 120).

At operation 402, reticle 502 is provided.

FIG. 5B depicts a simplified block diagram of a reticle suitable for the formation of each of input-coupler blocks 104-1 through 104-M.

Reticle 502 is analogous to reticle 500 described above; however, reticle 502 includes all mask levels required for the formation of an input-coupler block 104. For clarity, only the waveguide ports of lateral interface 126-3 are indicated in FIG. 5B. The reticle pattern of reticle 502 has the same perimeter as that of input-coupler block 104 (i.e., perimeter 130).

At operation 403, reticle 504 is provided.

FIG. 5C depicts a simplified block diagram of a reticle suitable for the formation of each of output-coupler blocks 106-1 through 106-N.

Reticle 504 is analogous to reticle 500 described above; however, reticle 504 includes all mask levels required for the formation of an output-coupler block 104. For clarity, only the waveguide ports of vertical interface 128-3 are indicated in FIG. 5C. The reticle pattern of reticle 504 has the same perimeter as that of output-coupler block 104 (i.e., perimeter 134).

At operation 404, reticle 500 is sequentially stepped through each of switch-block fields 602-1,1 through 602-M,N to define switch blocks 102-1,1 through 102-M,N.

Figure 6:
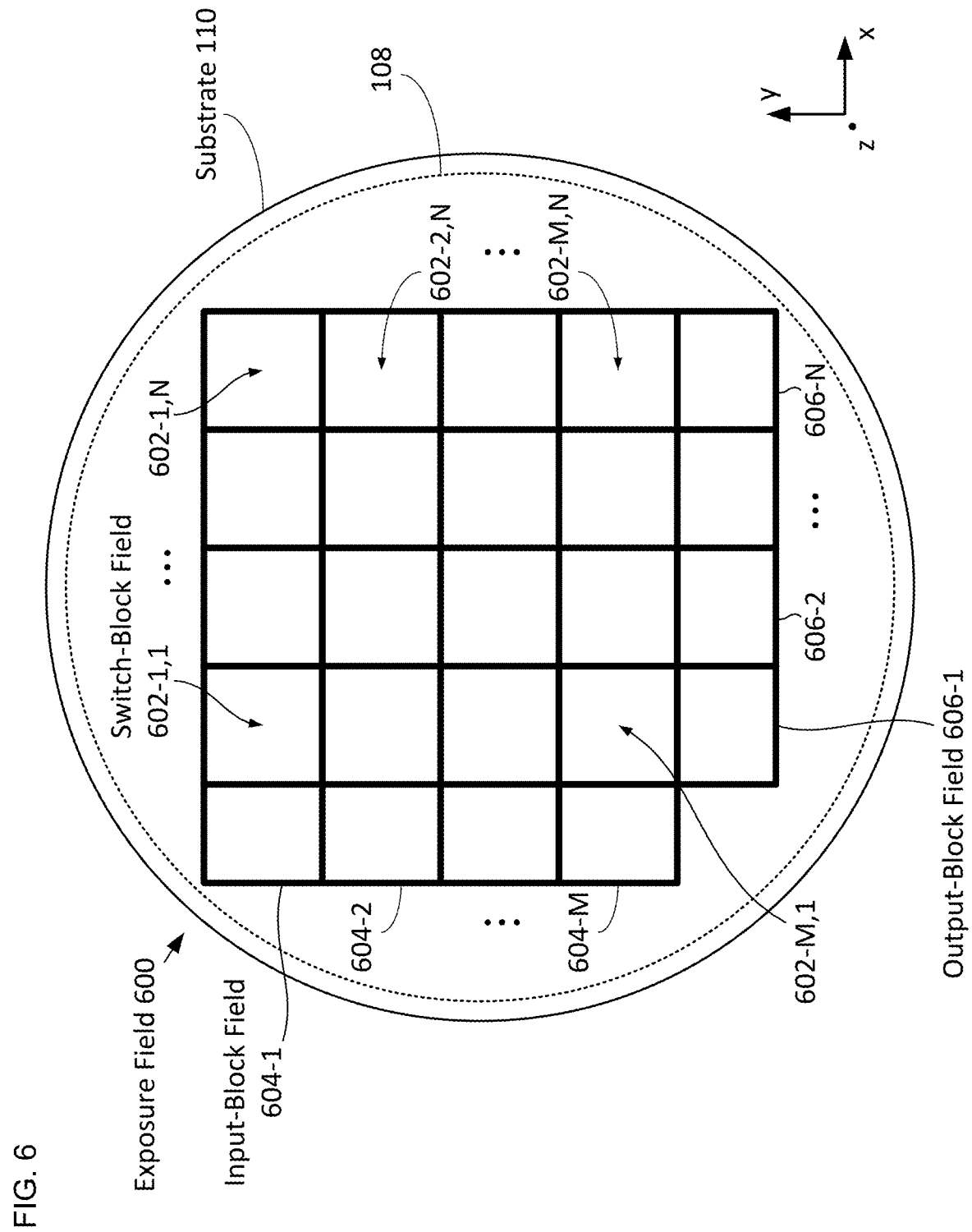
FIG. 6 depicts a schematic drawing of a composite exposure field suitable for forming a wafer-scale mask pattern in accordance with the present disclosure.

FIG. 6 depicts a schematic drawing of a composite exposure field suitable for forming a wafer-scale mask pattern in accordance with the present disclosure. Exposure field 600 includes switch-block fields 602-1,1 through 602-M,N (referred to, collectively, as switch-block fields 602), input-block fields 604-1 through 604-M (referred to, collectively, as input-block fields 604), and output-block fields 606-1 through 606-N (referred to, collectively, as output-block fields 606).

Switch-block fields 602 are arranged in a two-dimensional array of contiguous regions within area 108 such that switch blocks 102-1,1 through 102-M,N (referred to, collectively, as switch blocks 102), formed by the plurality of exposures of reticle 500, meet at their lateral and vertical interfaces. As a result, the waveguide patterns formed in switch-block fields 602 are stitched together to form a plurality of bus waveguides that extend through the entirety of the pattern of switch-block fields.

It should be noted that, in the depicted example, each of switch-block fields 602 has the same shape as the reticle pattern of reticle 500. As a result, reticle patterns formed in adjacent switch blocks abut one where their lateral interfaces or vertical interfaces meet. In some embodiments, switch-block fields 602 are configured such that lateral and vertical interfaces of adjacent reticle patterns overlap slightly to provide some alignment tolerance between them.

At operation 405, reticle 502 is sequentially stepped through each of input-block fields 604-1 through 604-M to define input-coupler blocks 104-1 through 104-M.

Input-block fields 604 are arranged in a one-dimensional array of contiguous regions within area 108 such that input-coupler blocks 104-1 through 104-M abut switch blocks 102-1,1 through 102-M,1 at their respective lateral interfaces 126-3 and 126-1. As a result, the waveguide patterns formed in input-block fields 604-1 through 604-M are stitched together with the waveguide patterns formed in switch-block fields 602-1,1 through 602-M,1 to optically couple input ports 112 with the plurality of laterally oriented bus waveguides that extend from west to east through the pattern of switch blocks.

At operation 406, reticle 504 is sequentially stepped through each of output-block fields 606-1 through 606-N to define output-coupler blocks 106-1 through 106-N.

Output-block fields 606 are arranged in a one-dimensional array of contiguous regions within area 108 such that output-coupler blocks 106-1 through 106-N abut switch blocks 102-M,1 through 102-M,N at their respective vertical interfaces 128-3 and 128-2. As a result, the waveguide patterns formed in output-block fields 606-1 through 606-N are stitched together with the waveguide patterns formed in switch-block fields 602-M,1 through 602-M,N to optically couple output ports 114 with the plurality of vertically oriented bus waveguides that extend from north to south through the pattern of switch blocks.

It should be noted that operations 404 through 406 are repeated for each mask levels included in reticles 500, 502, and 504.

One skilled in the art will recognize that, as a reticle is positioned at its intended exposure field in switch-block fields 602, input-block fields 604, and output-block fields 606, slight positioning errors can occur relative to a reticle pattern exposed at one or more adjacent exposure fields. These positioning errors are commonly referred to as "stitching error." For conventional step-and-repeat lithography, stitching errors are typically in the range of 10 to 100 nm, depending on the lithography tool employed.

When fabricating surface waveguides that extend across multiple reticle fields, stitching errors can give rise to a misalignment of a bus waveguide where it meets at the juncture of adjacent switch blocks, which can lead to significant propagation loss in a light signal as it propagates through a switching system. For example, a stitching error of 100 nm at a single waveguide joint will cause approximately 0.27 dB loss in an 800-nm-wide waveguide. In a large-scale switch, such as switching system 100, a light signal will traverse numerous waveguide joints as it progresses through the system. As a result, the cumulative loss from stitching errors can be substantial.

In some embodiments, the waveguide ports of switch block 102, input-coupler block 104, and output-coupler block 106 include a low-loss coupling region that mitigates optical loss due to stitching errors.

Figure 7:
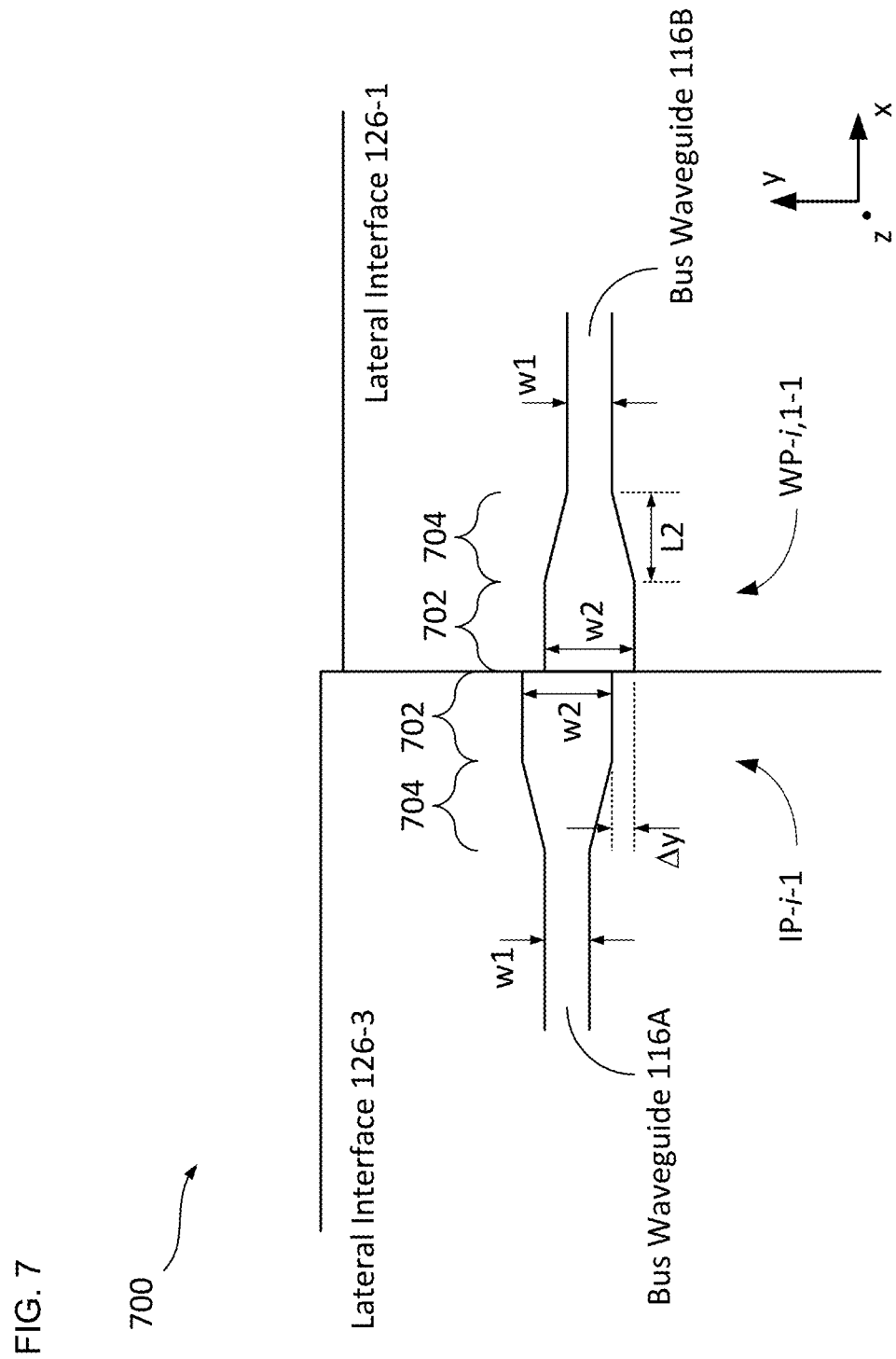
FIG. 7 depicts a schematic drawing of a representative coupling region at the interface between two waveguide ports.

FIG. 7 depicts a schematic drawing of a representative coupling region at the interface between two waveguide ports. In the depicted example, coupling region 700 is the coupling region at which input port IP-i-1 of input-coupler block 104-i and western port WP-i,1-1 of switch block 1024,1 join. Coupling region 700 includes coupling portions 702A and 702B, where coupling portion 702A is the termination of bus waveguide 116A of waveguide port IP-i-1 and coupling portion 702B terminates bus waveguide 116B of waveguide port WP-i,1-1. Each bus waveguide includes taper region 704, in which the width of the bus waveguide tapers over the length, L2, of the taper region from the bus-waveguide width, w1, to the width, w2, of coupling portion 702. In the depicted example, w1 is equal to approximately 550 nm and w2 is equal to approximately 10 microns; however, other values of w1 and/or w2 can be used without departing from the scope of the present disclosure. Typically, L2 is within the range of a few microns to a few hundred microns; however, L2 can have any practical value without departing from the scope of the present disclosure.

By virtue of waveguide-coupling region 700, the transmission efficiency between bus waveguides 116A and 116B is roughly equal to $\exp[-(\Delta y/(w2/2))^2]$, where $\Delta y$ is the misalignment between coupling portions 702A and 702B. By expanding the widths of the bus waveguides to 10 microns, a misalignment, $\Delta y$, of approximately 100 nm gives rise to a loss of only 0.001 dB, as compared to a loss of approximately 0.25 dB for bus waveguides without such coupling regions.

Figure 8:
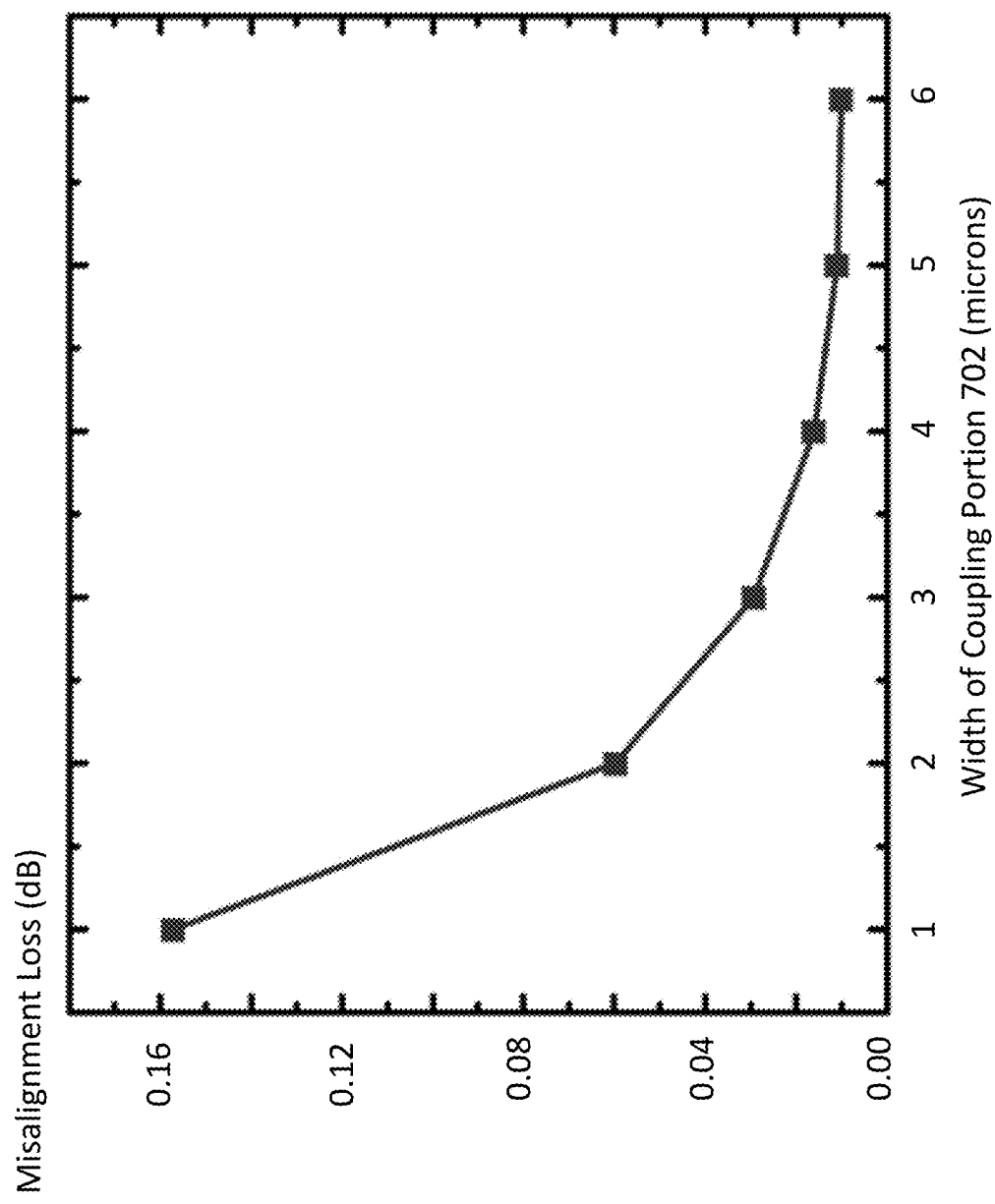
FIG. 8 depicts simulated optical loss due to stitching error as a function of the width, w2, of coupling portion 702.

FIG. 8 depicts simulated optical loss due to stitching error as a function of the width, w2, of coupling portion 702. The results depicted in plot 800 are derived for a fixed misalignment of 100 nm.

It should be noted that, with the addition of one or more additional elements, such as additional input-coupler blocks, output-coupler blocks, array-waveguide gratings, and the like, the teachings of the present disclosure are applicable to embodiments other than a P×Q switching system, such as reconfigurable optical add-drop multiplexers (ROADM), wavelength-selective cross-connects (WXC), and the like.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A monolithically integrated optical switching system comprising:
   (1) a plurality of input ports (112-1,1 through 112-M,m);
   (2) a plurality of output ports (114-1,1 through 114-N,n); and
   (3) a plurality of switch blocks (102) that is arranged to collectively define a switching matrix (118), wherein each switch block is substantially identical and characterized by a first reticle pattern that is no larger than a lithography reticle, the first reticle pattern having a perimeter (120) that includes first (122W), second (122E), third (122N), and fourth (122S) edges, and wherein each switch block includes:
   a first plurality of bus waveguides (116), each having a first width (w1) and extending between a first port (WP) at the first edge and a second port (EP) the second edge, each of the first and second ports including a first coupling portion (704) having a second width (w2) and a first taper region that optically couples the bus waveguide and the first coupling portion, wherein the plurality of first ports is arranged in a first arrangement that defines a first lateral interface (126-1), and wherein the plurality of second ports is arranged in the first arrangement to define a second lateral interface (126-2) that matches the first lateral interface;
   a second plurality of bus waveguides that extends between a third port (NP) at the third edge and a fourth port (SP) at the fourth edge, wherein the plurality of third ports is arranged in a second arrangement that defines a first vertical interface (128-1), and wherein the plurality of fourth ports is arranged in the second arrangement to define a second vertical interface (128-2) that matches the first vertical interface; and
   a plurality of switches (120), each switch being operatively coupled with a bus waveguide of the first plurality thereof and a bus waveguide of the second plurality thereof;

wherein the first pluralities of bus waveguides of each laterally abutting switch-block pair are joined via a pair of lateral interfaces;

wherein the second pluralities of bus waveguides of each vertically abutting switch-block pair are joined via a pair of vertical interfaces;

wherein the plurality of switch blocks is arranged such that the switch matrix is operative for optically coupling any input port of the plurality thereof with any output port of the plurality thereof; and wherein the switching matrix is larger than the lithography reticle.

2. The system of claim 1 wherein the first arrangement is the same as the second arrangement.

3. The system of claim 1 wherein at least one bus waveguide of the first and second pluralities thereof comprises a material selected from the group consisting of silicon and silicon nitride.

4. The system of claim 1 wherein each switch of the plurality thereof includes a first shunt waveguide (202) and an actuator (206) for moving the shunt waveguide between a first position and a second position, and wherein the first port and second port are optically coupled when the shunt waveguide is in the first position, and wherein the first port and the fourth port are optically coupled when the shunt waveguide is in the second position, and further wherein the shunt waveguide includes at least one stand-off (302) that establishes a first separation (s3) between a first end (206-2) of the shunt waveguide and a waveguide portion (208-2) when the shunt waveguide is in the second position.

5. The system of claim 4 wherein each switch of the plurality thereof includes a second shunt waveguide (202-2) and a second actuator (206-2) for moving the second shunt waveguide between a third position and a fourth position, and wherein the third port and fourth port are optically coupled when the second shunt waveguide is in the third position, and wherein the third port and the second port are optically coupled when the second shunt waveguide is in the fourth position.

6. The system of claim 1 further comprising a plurality of input-coupler blocks (104), wherein each input-coupler block is substantially identical and characterized by a second reticle pattern that is no larger than the lithography reticle, the second reticle pattern having a second perimeter (130) that includes a fifth edge (132E), and wherein each input-coupler block includes:
a second plurality of input ports (112-1,1 through 112-1, m), the first plurality of input ports including the second plurality of input ports; and
a third plurality of bus waveguides that extends between the second plurality of input ports and a plurality of fifth ports (IP-i,1 through IP-i,m) located at the fifth edge, wherein the third plurality of bus waveguides is arranged in the first arrangement to define a third lateral interface (126-3) at each of the fifth edge.

7. The system of claim 6 further comprising a plurality of output-coupler blocks (106), wherein each output-coupler block is substantially identical and characterized by a third reticle pattern that is no larger than the lithography reticle, the third reticle pattern having a third perimeter (134) that includes a sixth edge (136N), and wherein each input-coupler block includes:
a second plurality of output ports (114-j,1 through 114-j, n), the first plurality of output ports including the second plurality of output ports; and
a fourth plurality of bus waveguides that extends between the second plurality of output ports and a plurality of sixth ports (OP-j,1 through OP-j,n) located at the sixth edge, wherein the fourth plurality of bus waveguides is arranged in the second arrangement to define a vertical interface (128) at each of the fifth edge.

8. The system of claim 1 wherein the plurality of switch blocks is arranged in an M×N array, and wherein the plurality of switches in each switch block is arranged in an m×n array, and wherein the plurality of input ports is arranged in a P×1 linear array, where P=M*m, and further wherein the plurality of output ports is arranged in a 1×Q linear array, where Q=N*n.

9. The system of claim 8 wherein each of P and Q is greater than 100.

10. The system of claim 1 wherein each first port, second port, third port, and fourth port includes a low-loss coupling region.

11. The system of claim 1 further comprising an electronic circuit (138).

12. The system of claim 1 wherein the bus waveguides of each of the switch blocks of the plurality thereof are configured such that a light signal comprising a TE-polarization component and a TM-polarization component can propagate from any input port of the plurality thereof to any output port of the plurality thereof with a substantially equal loss for each of the TE- and TM-polarization components that is less than or equal to 1 dB.

13. The system of claim 1 wherein, in at least one switch block of the plurality thereof, the first plurality of bus waveguides and the second plurality of waveguides lie in the same plane.

14. A method for forming a monolithically integrated-optical switching system, the method comprising:
(1) providing a first lithography reticle (500) operative for patterning a switch block (102), wherein the first lithography reticle defines a first reticle pattern that has a first perimeter (120) that includes first (122W), second (122E), third (122N), and fourth (122S) edges, and wherein the switch block includes:
(a) a first plurality of bus waveguides (116), each having a first width (w1) and extending between a first port (WP) at the first edge and a second port (EP) the second edge, each of the first and second ports including a coupling portion (704) having a second width (w2) and a taper region that optically couples the bus waveguide and the coupling portion, wherein the plurality of first ports is arranged in a first arrangement that defines a first lateral interface (126-1), and wherein the plurality of second ports is arranged in the first arrangement to define a second lateral interface (126-2) that matches the first lateral interface;
(b) a second plurality of bus waveguides that extends between a third port (NP) at the third edge and a fourth port (SP) at the fourth edge, wherein the plurality of third ports is arranged in a second arrangement that defines a first vertical interface (128-1), and wherein the plurality of fourth ports is arranged in the second arrangement to define a second vertical interface (128-2) that matches the first vertical interface; and
a plurality of switches (120), each switch being operatively coupled with a bus waveguide of the first plurality thereof and a bus waveguide of the second plurality thereof; and
(2) forming a plurality of switch blocks, each sub-array being based on the first lithography reticle and being formed in a different first exposure field (602) of a plurality thereof such that the plurality of first reticle patterns are stitched together to define a switch matrix (118) that is operative for optically coupling any input port (112) of a first plurality of input ports with any output port (114) of a first plurality of output ports;
wherein the switching matrix is larger than the first lithography reticle.

15. The method of claim 14 further comprising:
(3) providing a second lithography reticle (502) operative for patterning an input-coupler block (104), wherein the second lithography reticle defines a second reticle pattern that has a second perimeter (130) that includes a fifth edge (132E), and wherein the input-coupler block includes a second plurality of input ports (112-1,1 through 112-1,$m$) that is included in the first plurality of input ports, and a third plurality of bus waveguides that extend from the second plurality of input ports to a plurality of fifth ports (IP-1,1 through IP-1,$m$), and further wherein the plurality of fifth ports is arranged in the first arrangement to define a third lateral interface (126-3); and
(4) forming a plurality of input-coupler blocks, each input-coupler block being based on the second lithography reticle and being formed in a different second exposure field (604) of a plurality thereof such that each second reticle pattern is stitched together with a different first reticle pattern of the plurality thereof.

16. The method of claim 15 further comprising:
(5) providing a third lithography reticle (502) operative for patterning an output-coupler block (106), wherein the third lithography reticle defines a third reticle pattern that has a third perimeter (134) that includes a sixth edge (136N), and wherein the output-coupler block includes a second plurality of output ports (114-1,1 through 114-1,$n$) that is included in the first plurality of output ports, and a fourth plurality of bus waveguides that extend from the second plurality of output ports to a plurality of sixth ports (OP-1,1 through OP-1,$n$), and further wherein the plurality of sixth ports is arranged in the first arrangement to define a third vertical interface (128-3); and
(6) forming a plurality of output-coupler blocks, each output-coupler block being based on the third lithography reticle and being formed in a different third exposure field (606) of a plurality thereof such that each third reticle pattern is stitched together with a different first reticle pattern of the plurality thereof.

17. The method of claim 14 wherein the first arrangement is the same as the second arrangement.

18. The method of claim 14 wherein at least one switch block of the plurality thereof is formed such that at least one bus waveguide of the first and second pluralities thereof comprises a material selected from the group consisting of silicon and silicon nitride.

19. The method of claim 14 wherein the first reticle is provided such that each switch of the plurality thereof includes a first shunt waveguide (202) and an actuator (206) for moving the shunt waveguide between a first position and a second position, and wherein the first port and second port are optically coupled when the shunt waveguide is in the first position, and wherein the first port and the fourth port are optically coupled when the shunt waveguide is in the second position, and further wherein the shunt waveguide includes a at least one stand-off (302) that establishes a first separation (s3) between a first end (206-2) of the shunt waveguide and a waveguide portion (208-2) when the shunt waveguide is in the second position.

20. The method of claim 19 wherein the first reticle is provided such that each switch of the plurality thereof further includes a second shunt waveguide (202-2) and a second actuator (206-2) for moving the second shunt waveguide between a third position and a fourth position, and wherein the third port and fourth port are optically coupled when the second shunt waveguide is in the third position, and wherein the third port and the second port are optically coupled when the second shunt waveguide is in the fourth position.

21. The method of claim 14 further comprising (3) providing an electronic circuit (138) that is operatively coupled with the plurality of switch blocks.

22. The method of claim 14 wherein the plurality of switch blocks is formed such that a light signal comprising a TE-polarization component and a TM-polarization component can propagate from any input port of the plurality thereof to any output port of the plurality thereof with a substantially equal loss for each of the TE- and TM-polarization components that is less than or equal to 1 dB.

23. The method of claim 14 wherein, in at least one switch block of the plurality thereof, the first plurality of bus waveguides and the second plurality of waveguides lie in the same plane.

24. The system of claim 1 wherein each of the second plurality of bus waveguides has the first width, and wherein each of the third port and fourth port of each bus waveguide of the second plurality thereof includes:
a second coupling portion (704) having the second width; and
a second taper region that optically couples the bus waveguide and the second coupling portion.

25. The method of claim 14 wherein each of the second plurality of bus waveguides has the first width, and wherein each of the third port and fourth port of each bus waveguide of the second plurality thereof includes:
a second coupling portion (704) having the second width; and
a second taper region that optically couples the bus waveguide and the second coupling portion.

* * * * *